(12) United States Patent
Barnard

(10) Patent No.: US 11,812,892 B1
(45) Date of Patent: Nov. 14, 2023

(54) FLUID TEXTURING DEVICE

(71) Applicant: SharkNinja Operating LLC, Needham, MA (US)

(72) Inventor: Pierce Barnard, Manly (AU)

(73) Assignee: SharkNinja Operating LLC, Needham, MA (US)

( * ) Notice: Subject to any disclaimer, the term of this patent is extended or adjusted under 35 U.S.C. 154(b) by 0 days.

(21) Appl. No.: 17/728,677

(22) Filed: Apr. 25, 2022

(51) Int. Cl.
*A47J 31/44* (2006.01)
*A47J 43/07* (2006.01)
*A47J 31/52* (2006.01)

(52) U.S. Cl.
CPC ....... *A47J 31/4489* (2013.01); *A47J 31/5253* (2018.08); *A47J 43/0711* (2013.01)

(58) Field of Classification Search
CPC    A47J 31/005; A47J 31/02; A47J 31/20; A47J 31/24; A47J 31/30; A47J 31/132; A47J 31/38; A47J 31/44; A47J 31/446; A47J 31/467; A47J 31/468; A47J 31/605; A47J 31/4407; A47J 31/5253; A47J 31/521; A47J 31/3633; A23F 3/166
USPC ......... 99/280, 281, 282, 283, 284, 287, 292, 99/295, 297, 303, 306, 308, 322
See application file for complete search history.

(56) References Cited

U.S. PATENT DOCUMENTS

| | | |
|---|---|---|
| 7,172,177 B2 | 2/2007 | Durda |
| 7,264,232 B2 | 9/2007 | Rohde |
| 8,348,186 B2 | 1/2013 | Seidler et al. |
| 8,616,118 B1 * | 12/2013 | Lassota ................. A47J 31/446 99/299 |
| 8,668,376 B2 | 3/2014 | Krauchi et al. |
| 8,726,790 B2 | 5/2014 | Lane et al. |
| 8,733,234 B2 | 5/2014 | Boussemart et al. |
| 8,875,618 B2 | 11/2014 | Boussemart et al. |
| 8,960,080 B2 | 2/2015 | Saito |
| 9,003,957 B2 | 4/2015 | Pagano |
| 9,060,646 B2 | 6/2015 | Ait Bouziad et al. |
| 9,107,533 B2 | 8/2015 | Volz et al. |
| 9,113,751 B2 | 8/2015 | Cocco et al. |

(Continued)

FOREIGN PATENT DOCUMENTS

| | | |
|---|---|---|
| AU | 2020312635 A1 | 1/2022 |
| CN | 101106928 A | 1/2008 |

(Continued)

OTHER PUBLICATIONS

International Search Report and Written Opinion dated Mar. 15, 2023 in PCT Application No. PCT/CN2022/115246, filed on Aug. 26, 2022, 10 pages.

*Primary Examiner* — Phuong T Nguyen
(74) *Attorney, Agent, or Firm* — MINTZ LEVIN COHN FERRIS GLOVSKY AND POPEO, PC

(57) ABSTRACT

A fluid texturing device is provided for use with a beverage brewing apparatus. In one embodiment, the fluid texturing device includes a housing having a driveshaft and a steam injection tube disposed therein. The driveshaft has a whisk at the end thereof that is configured to rotate with the driveshaft, and the steam injection tube is configured to couple to a steam source and has an outlet for ejecting steam. The housing can be configured to couple to a beverage brewing apparatus to allow a motorized driver to cause rotation of the driveshaft about a longitudinal axis thereof, and to allow steam to be injected through the steam injection tube.

28 Claims, 22 Drawing Sheets

(56) References Cited

U.S. PATENT DOCUMENTS

| | | |
|---|---|---|
| 9,295,109 B2 | 3/2016 | Gerl et al. |
| 9,402,502 B2 | 8/2016 | Vanni et al. |
| 9,468,331 B2 | 10/2016 | De'Longhi |
| 9,603,481 B2 | 3/2017 | Giua et al. |
| 9,609,978 B2 | 4/2017 | Castelli et al. |
| 10,178,925 B2 | 1/2019 | Rithener et al. |
| 10,178,926 B2 | 1/2019 | Beaudet et al. |
| 10,362,895 B2 | 7/2019 | Beaudet et al. |
| 10,455,973 B2 | 10/2019 | Dollner et al. |
| 10,524,617 B2 | 1/2020 | Perrin et al. |
| 10,631,686 B2 | 4/2020 | Abdo et al. |
| 10,786,118 B2 | 9/2020 | Zeng et al. |
| 11,160,411 B2 | 11/2021 | Kettavong et al. |
| 11,246,446 B2 | 2/2022 | Anthony et al. |
| 2005/0029685 A1 | 2/2005 | Zhao |
| 2009/0116333 A1 | 5/2009 | Lu et al. |
| 2009/0255415 A1 | 10/2009 | Cheng et al. |
| 2012/0186462 A1 | 7/2012 | Breust |
| 2013/0032038 A1* | 2/2013 | Lee .................. A47J 43/046 99/348 |
| 2013/0269535 A1* | 10/2013 | Colantonio ............ A47J 31/22 99/295 |
| 2015/0013551 A1 | 1/2015 | Tsang et al. |
| 2015/0013552 A1 | 1/2015 | Tsang et al. |
| 2017/0318999 A1 | 11/2017 | Han et al. |
| 2019/0365142 A1* | 12/2019 | Beaudet .............. A47J 31/4482 |
| 2020/0138234 A1 | 5/2020 | Grassia et al. |
| 2021/0007319 A1 | 1/2021 | Hellmers et al. |
| 2021/0393074 A1 | 12/2021 | Weber et al. |

FOREIGN PATENT DOCUMENTS

| | | |
|---|---|---|
| CN | 201200323 Y | 3/2009 |
| CN | 201948820 U | 8/2011 |
| CN | 202044136 U | 11/2011 |
| CN | 202234930 U | 5/2012 |
| CN | 202269902 U | 6/2012 |
| CN | 102781292 A | 11/2012 |
| CN | 101947428 B | 1/2013 |
| CN | 202636716 U | 1/2013 |
| CN | 202698925 U | 1/2013 |
| CN | 202698926 U | 1/2013 |
| CN | 102233245 B | 3/2013 |
| CN | 202801244 U | 3/2013 |
| CN | 202908518 U | 5/2013 |
| CN | 103169379 A | 6/2013 |
| CN | 103203201 A | 7/2013 |
| CN | 103237483 A | 8/2013 |
| CN | 203302917 U | 11/2013 |
| CN | 203314747 U | 12/2013 |
| CN | 103505080 A | 1/2014 |
| CN | 203483288 U | 3/2014 |
| CN | 203506429 U | 4/2014 |
| CN | 203619395 U | 6/2014 |
| CN | 203693311 U | 7/2014 |
| CN | 203828698 U | 9/2014 |
| CN | 203852248 U | 10/2014 |
| CN | 203953322 U | 11/2014 |
| CN | 104207641 A | 12/2014 |
| CN | 203970116 U | 12/2014 |
| CN | 203987593 U | 12/2014 |
| CN | 204016064 U | 12/2014 |
| CN | 104706218 A | 6/2015 |
| CN | 204500413 U | 7/2015 |
| CN | 204683343 U | 10/2015 |
| CN | 204743776 U | 11/2015 |
| CN | 105193259 A | 12/2015 |
| CN | 105595851 A | 5/2016 |
| CN | 205286056 U | 6/2016 |
| CN | 205286123 U | 6/2016 |
| CN | 205286124 U | 6/2016 |
| CN | 103284601 B | 8/2016 |
| CN | 206120110 U | 4/2017 |
| CN | 106720022 A | 5/2017 |
| CN | 206166634 U | 5/2017 |
| CN | 206166635 U | 5/2017 |
| CN | 107361630 A | 11/2017 |
| CN | 107510366 A | 12/2017 |
| CN | 107510367 A | 12/2017 |
| CN | 207041419 U | 2/2018 |
| CN | 207041420 U | 2/2018 |
| CN | 107752804 B | 3/2018 |
| CN | 105451618 B | 4/2018 |
| CN | 104207641 B | 5/2018 |
| CN | 108175277 A | 6/2018 |
| CN | 104939683 B | 8/2018 |
| CN | 105768880 B | 10/2018 |
| CN | 108852055 A | 11/2018 |
| CN | 208144910 U | 11/2018 |
| CN | 208404176 U | 1/2019 |
| CN | 109381026 A | 2/2019 |
| CN | 208551295 U | 3/2019 |
| CN | 208658655 U | 3/2019 |
| CN | 104869876 B | 4/2019 |
| CN | 208692999 U | 4/2019 |
| CN | 208725556 U | 4/2019 |
| CN | 208725557 U | 4/2019 |
| CN | 105942860 B | 5/2019 |
| CN | 109864585 A | 6/2019 |
| CN | 208925925 U | 6/2019 |
| CN | 209074206 U | 7/2019 |
| CN | 209574472 U | 11/2019 |
| CN | 209789654 U | 12/2019 |
| CN | 110652207 A | 1/2020 |
| CN | 209984034 U | 1/2020 |
| CN | 209984036 U | 1/2020 |
| CN | 110934498 A | 3/2020 |
| CN | 210276947 U | 4/2020 |
| CN | 210748868 U | 6/2020 |
| CN | 211186946 U | 8/2020 |
| CN | 212140184 U | 12/2020 |
| CN | 112244669 A | 1/2021 |
| CN | 212415491 U | 1/2021 |
| CN | 112568748 A | 3/2021 |
| CN | 213309229 U | 6/2021 |
| CN | 214341790 U | 10/2021 |
| CN | 214653940 U | 11/2021 |
| CN | 114126456 A | 3/2022 |
| DE | 102007035939 A1 | 2/2009 |
| EP | 1197175 A1 | 4/2002 |
| EP | 1827188 B1 | 1/2009 |
| EP | 1833338 B1 | 2/2009 |
| EP | 2198762 B1 | 8/2011 |
| EP | 2299879 B1 | 5/2012 |
| EP | 2348932 B1 | 11/2012 |
| EP | 2341806 B1 | 1/2013 |
| EP | 2568859 A1 | 3/2013 |
| EP | 2721980 A1 | 4/2014 |
| EP | 2547243 B1 | 5/2014 |
| EP | 2606783 B1 | 5/2014 |
| EP | 2737832 A1 | 6/2014 |
| EP | 2910160 A1 | 8/2015 |
| EP | 2898802 B1 | 9/2018 |
| EP | 2882320 B1 | 10/2018 |
| EP | 2875759 B1 | 6/2019 |
| EP | 2946707 B1 | 6/2019 |
| EP | 3473145 A4 | 6/2019 |
| EP | 3586702 A1 | 1/2020 |
| EP | 3424377 B1 | 3/2020 |
| EP | 3626138 A1 | 3/2020 |
| EP | 3517000 B1 | 6/2020 |
| EP | 3516999 B1 | 7/2020 |
| EP | 3586703 B1 | 11/2020 |
| EP | 3626137 B1 | 6/2021 |
| EP | 3626136 B1 | 7/2021 |
| EP | 3586702 B1 | 1/2022 |
| EP | 3965624 A1 | 3/2022 |
| FR | 3083070 B1 | 6/2020 |
| WO | 2011142661 A1 | 11/2011 |
| WO | 2012093157 A1 | 7/2012 |
| WO | 2013033996 A1 | 3/2013 |
| WO | 2013107131 A1 | 7/2013 |
| WO | 2018201178 A1 | 11/2018 |

(56) References Cited

FOREIGN PATENT DOCUMENTS

| WO | 2019000016 A1 | 1/2019 |
| WO | 2020113288 A1 | 6/2020 |
| WO | 2020182244 A2 | 9/2020 |
| WO | 2020182244 A3 | 11/2020 |
| WO | 2021009032 A1 | 1/2021 |
| WO | 2021160893 A1 | 8/2021 |

\* cited by examiner

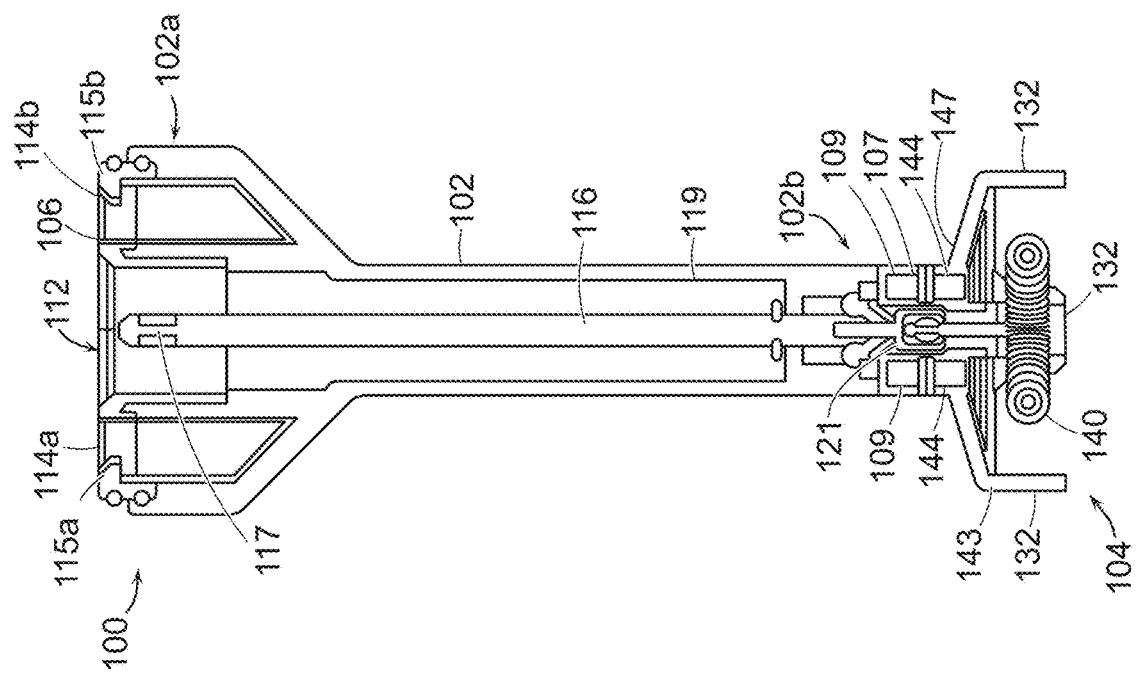
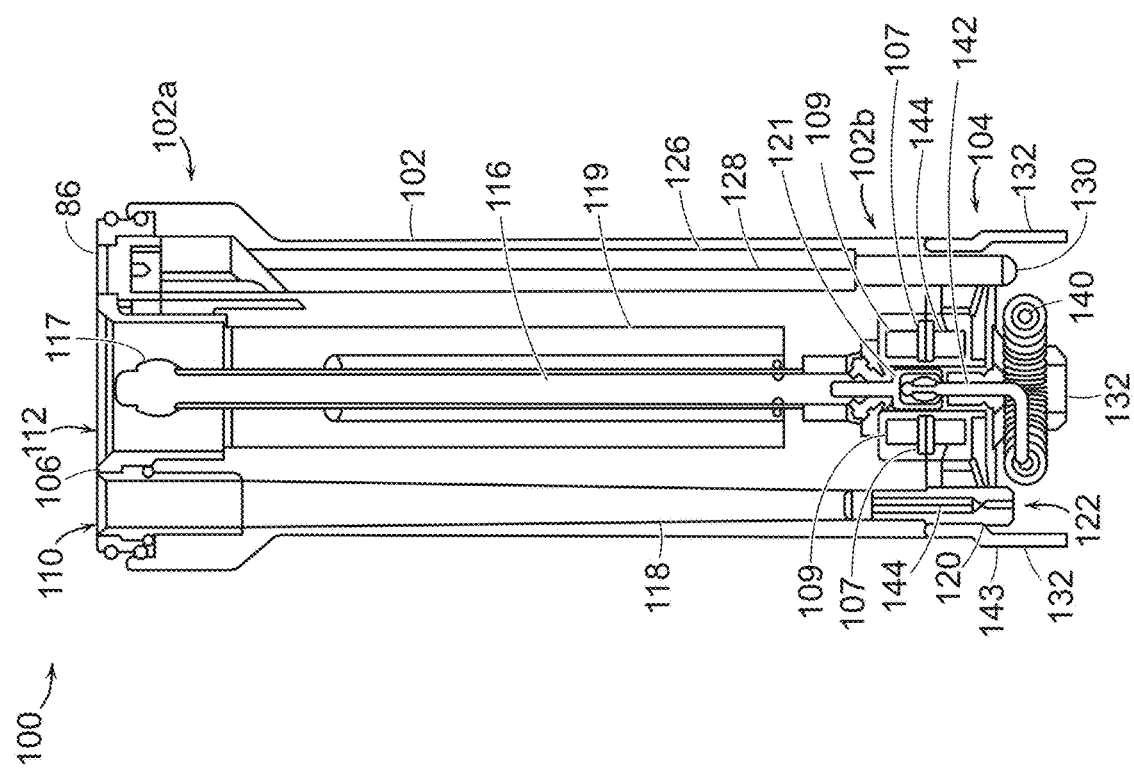

FLUID TEXTURING DEVICE

FIELD

Beverage brewing apparatuses and fluid texturing devices for use therewith is provided.

BACKGROUND

Various systems and methods for brewing a beverage, such as coffee or tea, are known. These systems typically include drip brewing systems in which hot water is brewed through coffee grounds and into a carafe, or French press systems in which coffee grounds and water are mixed in a container and a water permeable plunger is pressed into the container from above to trap the ground coffee at the bottom of the container. Existing beverage brewing systems are typically designed to receive only a single format of flavorant, such as loose coffee grinds, or alternatively, a prepackaged capsule or cartridge of coffee grinds.

Many coffee and espresso based drinks include a form of heated and textured milk or milk-like substitute. A device that includes a means of steam injection as a heat source in conjunction with a spinning whisk to aid in the distribution of steam and air throughout milk or a milk-like substitute is known as a fluid texturing device. In order to achieve the proper consistency using a steam source, a user must be trained to add the proper amount of steam and whisking to the milk. At-home or stand-alone devices for texturing fluid propose to provide a simpler operation with similar texturing results. However, many of these devices are insufficient at producing a properly textured product. Existing integrated or stand-alone fluid texturing devices result in a single milk froth type across all settings due to their limited capacity.

SUMMARY

Beverage brewing apparatuses and fluid texturing devices for use therewith are provided.

In one embodiment, a fluid texturing device is provided having a housing with a driveshaft and a steam injection tube extending therethrough, and a whisk assembly removably coupled to one end of the housing. The whisk assembly can include a rotatable whisk that is configured to couple to the driveshaft such that the driveshaft can rotate the whisk. The steam injection tube can be configured to extend through the whisk assembly to position an outlet steam injection extend at the end of the steam injection tube adjacent to the whisk.

The whisk assembly can have a variety of configurations. For example, in some embodiments, the whisk assembly can include a whisk cover configured to be magnetically coupled to the housing. The rotatable whisk can be disposed within and surrounded by the whisk cover. In some embodiments, the first end of the driveshaft can be configured to couple to a motorized driver for causing rotation of the driveshaft about a longitudinal axis thereof. In other embodiments, the steam injection tube is spaced from the driveshaft such that the outlet is spaced from the whisk In another embodiment, a fluid texturing device is provided having a housing with a driveshaft, and a steam injection tube. The housing can extend between a first end and a second end. The driveshaft can be disposed within an inner lumen of the housing and can have a first end coupled to a first end of the housing. The first end of the driveshaft can be configured to couple to a motorized driver for causing rotation of the driveshaft about a longitudinal axis. The driveshaft can also have a second end adjacent to the second end of the housing, with a whisk is mounted thereon and configured to rotate with the driveshaft. The steam injection tube can similarly have a first end coupled to the first end of the housing and configured to couple to a steam source. A second end of the steam injection tube can be positioned adjacent to the second end of the housing and can have an outlet for ejecting steam therefrom. The steam injection channel can be spaced from the driveshaft such that the outlet is spaced from the whisk.

The housing can have a variety of configurations. For example, in some embodiments, the first end of the housing can have at least one connecting feature configured to removably couple the housing to a beverage brewing apparatus.

In some embodiments, a whisk cover can be removably coupled to the second end of the housing. The whisk cover can include a plurality of apertures. In certain embodiments, the whisk cover can be arranged between the second end of the housing and the whisk.

The steam injection tube can also have a variety of configurations. For example, in some embodiments, the steam injection tube can pass through an aperture within a whisk cover positioned around the whisk on the second end of the housing. In other embodiments, the outlet of the steam injection tube can be positioned vertically above the whisk.

The housing can also include a temperature sensor positioned adjacent the second end of the housing, and configured to output a temperature signal representing a temperature of a fluid surrounding the temperature sensor. In certain embodiments, the temperature sensor can be positioned vertically above the whisk.

In another embodiment, a beverage brewing apparatus is provided that includes a primary housing and a removable fluid texturing device. The primary housing can have a mounting arm having connecting feature thereon. The removable fluid texturing device can have a hollow secondary housing, a driveshaft with a whisk, and a steam injection tube. The hollow secondary housing can have a mating portion configured to removably engage with the connecting feature on the primary housing. The driveshaft can extend from the mating portion and through the hollow secondary body. The steam injection tube can also extend from the mating portion and through the hollow secondary body, and it can have an outlet configured for ejecting steam therefrom. In some embodiments, the steam injection tube can be spaced apart from the driveshaft such that the outlet is spaced from the whisk.

In some embodiments, the removable fluid texturing device can also include a temperature sensor positioned within the hollow secondary housing adjacent the whisk and it can be configured to output a temperature signal representing a temperature of a fluid surrounding the temperature sensor.

The connecting feature on the primary housing and mating portion on the secondary housing can have various configurations. In one embodiment, a first electrical terminal can be arranged on the primary housing and can be configured to contact a second electrical terminal positioned on the mating portion of the hollow secondary housing. In other aspects, the mating portion can be configured to mechanically couple the driveshaft to a motor arranged within the primary housing. It can also be configured to fluidly couple the steam injection tube to a fluid source in the primary housing for allowing steam to be delivered through the steam injection tube.

The beverage brewing apparatus can have a variety of configurations. For example, in some embodiments, the beverage brewing apparatus can include a controller including a processor configured to control delivering of steam from a steam source to the steam injection tube, and configured to control a motor in the primary housing for driving the driveshaft on the fluid texturing device to thereby rotate the whisk. The controller can also be configured to receive a temperature signal from a temperature sensor in the fluid texturing device. In certain aspects, when the temperature of the fluid is within a first temperature range, the controller can be configured to drive the motor at a first predetermined speed, and when the temperature of the fluid is within a second temperature range greater than the first temperature range, the controller can be configured to drive the motor at a second predetermined motor speed that is less than the first predetermined motor speed.

In some embodiments, the first predetermined motor speed can be configured to create a first vortex within the fluid such that steam emitted from the outlet of the steam injection tube and air surrounding a volume of the fluid is mixed prior to integration of the steam and air with the fluid. In other embodiments, the second predetermined motor speed can be configured to create a vortex within the fluid such that steam emitted from the outlet of the steam injection, and not air surrounding a volume of the fluid, is mixed with the fluid. In certain embodiments, the controller can be further configured to receive a user input, and a working time over which the second speed is employed can be varied based upon the user input.

In some embodiments, the primary housing can have a fluid reservoir, a fluid outlet, and at least one heater configured to heat fluid flowing from the fluid reservoir to the fluid outlet.

In another embodiment, a fluid texturing assembly is provided that includes a container, a cover, and a fluid texturing device. The container can have an opening and it can be configured to receive a fluid. The cover can have an aperture formed therein, and the cover can be positionable across the opening of the container. The fluid texturing device can include a housing and a removable a whisk assembly. The housing can extend between a first end and a second end, and it can be slidably disposable through the aperture of the cover. The whisk assembly can be removably coupled to the housing and it can include a rotatable whisk. In certain aspects, the housing can further include a steam injection tube extending there through and having an outlet positionable adjacent the whisk for ejecting steam therefrom.

The housing can have a variety of configurations. For example, in some embodiments, the housing can have a first end configured to removably couple to a beverage brewing apparatus, and a second end configured to removably couple to the whisk assembly. In other embodiments, the aperture can be configured to form a seal around the housing. In some embodiments, the housing can include a driveshaft extending through the housing. The driveshaft can have a first end coupled to the first end of the housing and configured to couple to a motorized driver for causing rotation of the driveshaft about a longitudinal axis thereof, and a second end adjacent the second end of the housing and configured to rotate the whisk.

In other embodiments, the controller can be configured to detect attachment of the fluid texturing device to the primary housing. In other aspects, the primary housing can include a mounting arm movably coupled thereto and having the connecting feature formed thereon.

BRIEF DESCRIPTION OF THE DRAWINGS

These and other features will be more readily understood from the following detailed description taken in conjunction with the accompanying drawings, in which:

FIG. 10A is a cross-sectional side view of the fluid texturing device of FIG. 9 taken along line 10A-10A in FIG. 9;

FIG. 10B is a cross-sectional side view of the fluid texturing device of FIG. 9 taken along line 10B-10B in FIG. 9;

FIG. 17A is a perspective view of the fluid texturing device of FIG. 14 shown in a disassembled configuration and shown in combination with a lid having an aperture extending there through;

Figure 1:
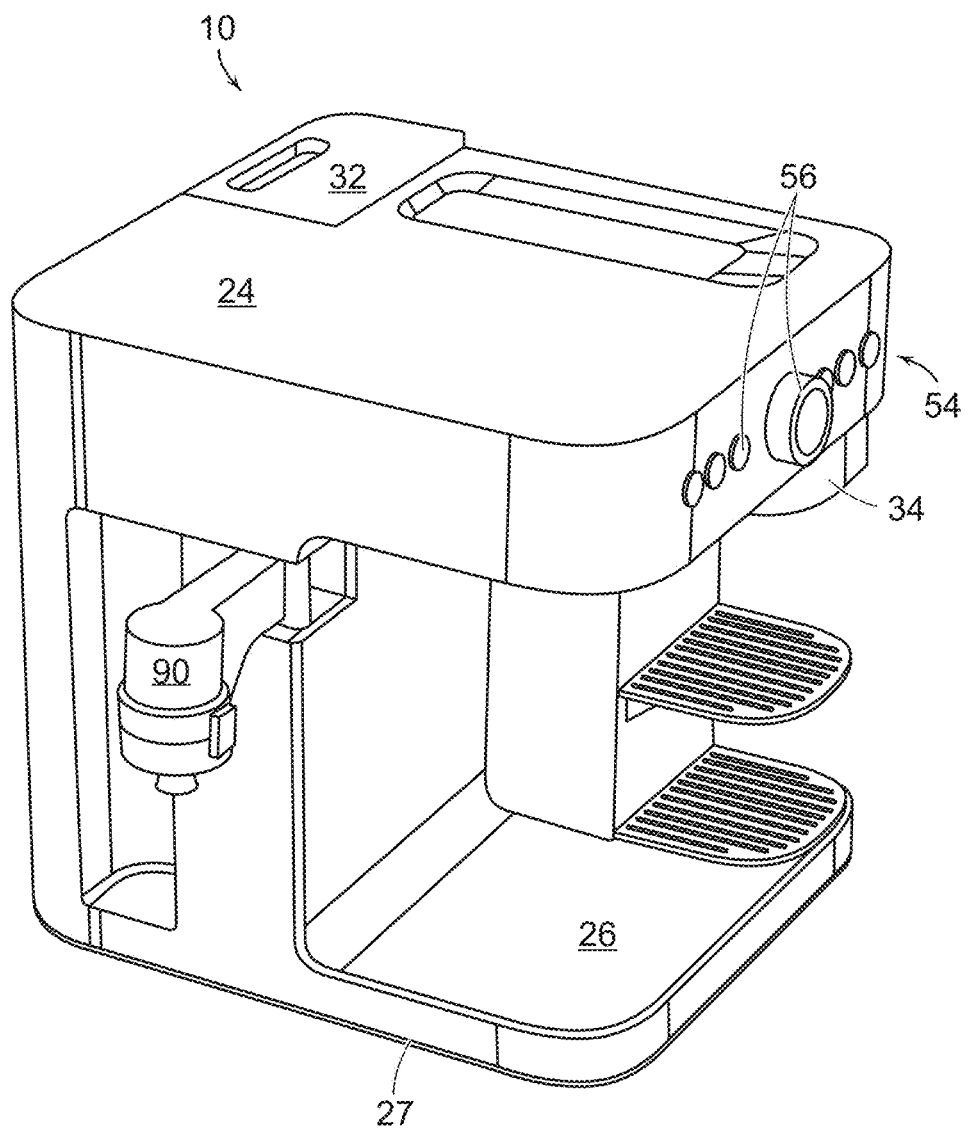
FIG. 1 is a front perspective view of one embodiment of a beverage brewing apparatus having a fluid texturing device coupled thereto.

It is noted that the drawings are not necessarily to scale. The drawings are intended to depict only typical aspects of the subject matter disclosed herein, and therefore should not be considered as limiting the scope of the disclosure.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

In general, when injecting steam into milk, water is being added to a degree, which in turn is diluting the milk. If the steam pressure is low, the time required to heat the milk will be longer, leading to more water injection. Therefore, the steam injection speed will be slower resulting in a large bubble size, which corresponds to a poor milk texture. The result is not textured milk, but rather hot milk with some aerated foam on top, which greatly effects the taste of a milk based drink, as the milk does not integrate with espresso in this state. Additionally, with a low steam pressure, under heating of the milk can occur. In the alternative, if the steam pressure is too high, the time required to heat the milk will be shorter. Therefore, the steam injection speed will be faster resulting in a smaller bubble size, which corresponds to a desired high-quality milk texture. However, by using a high-pressure steam, overheating of the milk can occur, which could lead to an undesirable texture.

Accordingly, a device for texturing a fluid, such as milk, is provided. In an exemplary embodiment, the fluid texturing device solves the aforementioned issues by altering the whisk speed to create different vortex types within a container during a texturing process. By altering the vortex, the integration of steam and air into a fluid within the container can be varied while separately controlling the whisk speed. At a high whisk speed, the vortex can be deep, allowing for the mixing of air and steam prior to being integrated into the fluid. Additionally, after a time period at the high whisk speed, the whisk can rotate at a low whisk speed causing a shallow vortex within the container, which allows only steam to be integrated into the fluid. By changing the whisk speed between different phases, the steam injection speed can be high, while also preventing overheating of the milk. Additionally, a temperature sensor can be positioned within the body of the texturing device to accurately measure the temperature of the fluid within the container as to not under or overheat the fluid to allow for the desired outcome as programmed by the user.

Figure 2:
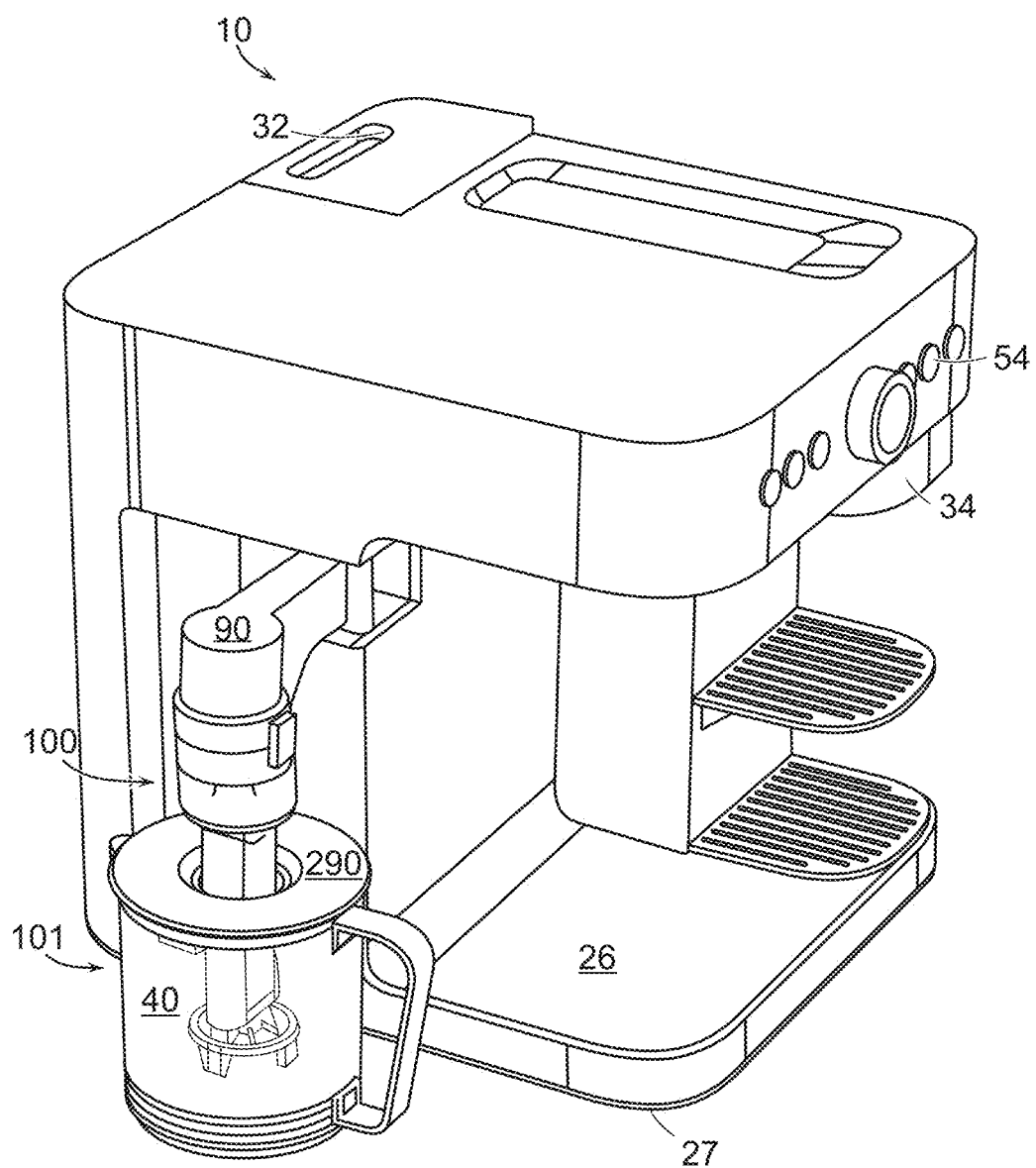
FIG. 2 is a front perspective view of the beverage brewing apparatus of FIG. 1 showing the fluid texturing device extending into a container.
Figure 3:
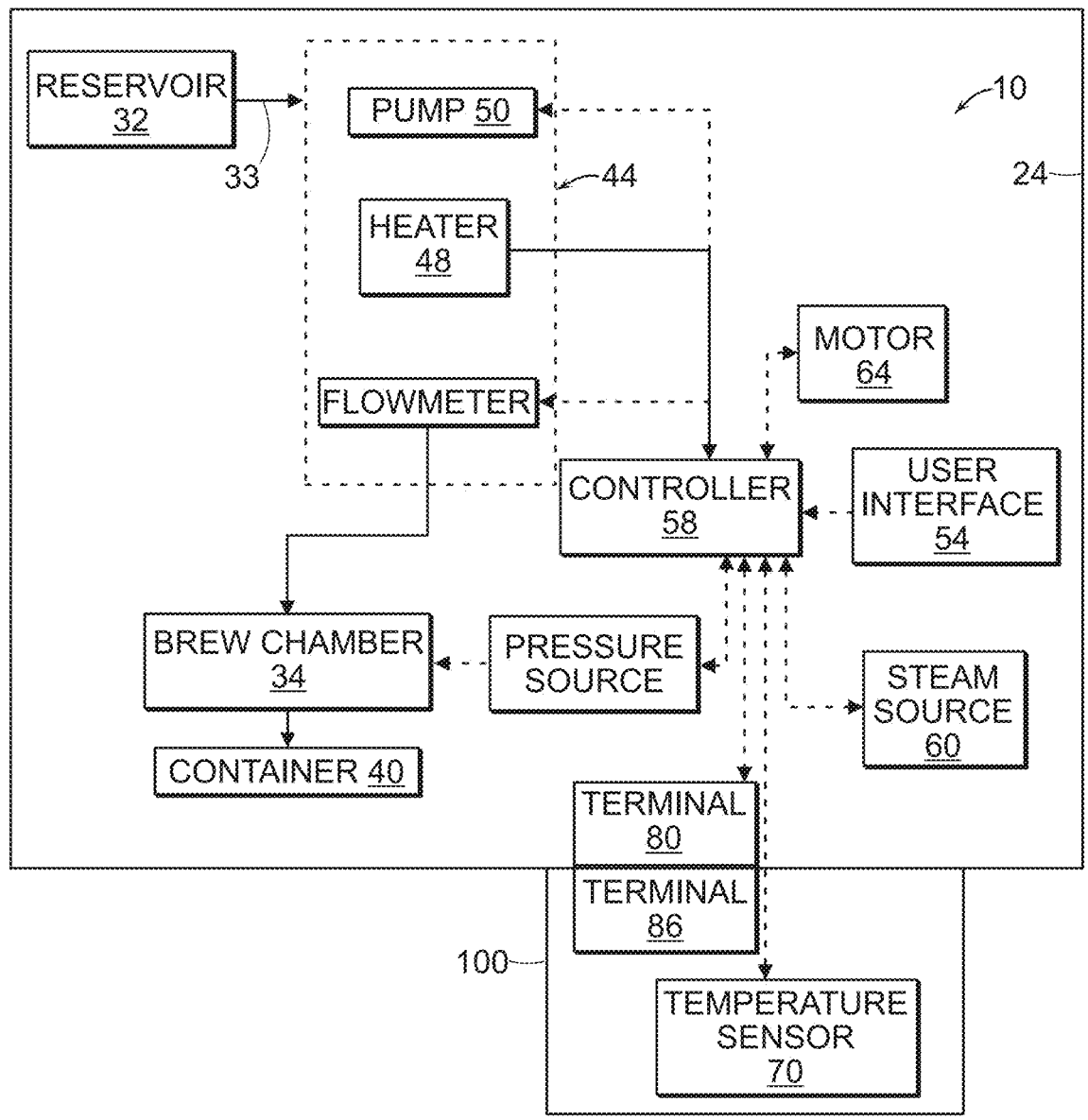
FIG. 3 is a schematic view of the internal components of the beverage brewing apparatus and fluid texturing device of FIG. 2.

FIGS. 1-3 illustrate one embodiment of a beverage brewing apparatus 10 operable to prepare a brewed beverage and suitable for use on a support surface, such as a countertop. A person skilled in the art will appreciate that the fluid texturing device disclosed herein can be used with any beverage brewing apparatus, and the illustrated apparatus is merely provided as one example of an apparatus for use with a fluid texturing device. As shown, the beverage brewing apparatus 10 generally includes a housing 24 having a base 26. A bottom surface 27 of the base 26 can be configured to be positioned on a support surface, such as a countertop. An upper surface of the base 26 can define an area for positioning a container configured to receive a brewed beverage output from the beverage brewing apparatus 10.

The beverage brewing system can also include a reservoir 32 arranged on the housing 24 and configured to store a desired amount of fluid therein, such as water, for brewing a beverage including but not limited to coffee or tea. The reservoir 32 can be removably connectable to the housing 24 for ease of filling. The housing 24 can also include a brew chamber 34 within which a flavorant, such as coffee grinds or tea leaves, may be positioned.

A fluid delivery system 44 is disposed within the housing 24 and is configured to communicate fluid from the reservoir 32 to the brew chamber 34. The fluid delivery system 44 can include at least one fluid supply line 33 or conduit extending between an outlet end of the reservoir 32 to an inlet of the brew chamber 34. The fluid delivery system 44 can also include a heater 48 operable to heat the water supplied from the reservoir 32 to a desired temperature prior to delivery to the brew chamber 34. Additionally, the fluid delivery system 44 can include a pumping mechanism 50 operable to provide a positive pumping action to push or draw a fluid, such as water, from the reservoir 32 through the at least one fluid supply line 33 and the heater to deliver the fluid to the brew chamber 34.

As further shown in FIG. 1, the beverage brewing apparatus 10 can include a user interface 54 for receiving one or more inputs from a user. The user interface 54 is formed at a portion of the housing 24, such as at a front surface adjacent the brew chamber 34. While the user interface 54 is shown on the front face of the housing 24, the user interface 54 can be located anywhere on the housing and the position can vary depending on the configuration of the beverage brewing apparatus 10. The user interface 54 can include one or more buttons, knobs, or other control input devices 56. Alternatively, or in addition, the user interface 54 can include a touch screen, or it can be configured to receive an input via from a smart device, such as a phone or tablet for example, via an "app" or other suitable connection. The operation of the user interface will be described in detail below.

Operation of the beverage brewing apparatus 10 can be controlled by a controller 58 operably coupled to the components of the beverage brewing apparatus 10, and configured receive one or more input signals from the user interface 54. The controller 58 can include one or more of a microprocessor, microcontroller, application specific integrated circuit (ASIC), or any other form of electronic controller known in the art.

A person skilled in the art will appreciate that the beverage brewing apparatus can have a variety of other configurations and can include various features, and that the illustrated beverage brewing apparatus is merely one exemplary embodiment. Other example embodiments of beverage brewing apparatuses are disclosed in U.S. Pat. No. 11,246,446, which is hereby incorporated by reference in its entirety.

In addition to having the necessary components for producing a brewed beverage, the beverage brewing apparatus 10 can also have a mounting arm 90 movably coupled to the housing 24 for mounting a fluid texturing device 10 onto the housing. In the illustrated embodiment, the mounting arm 90 is positioned on a side of the housing, however the mounting arm 90 can be positioned at various other locations.

Figure 4:
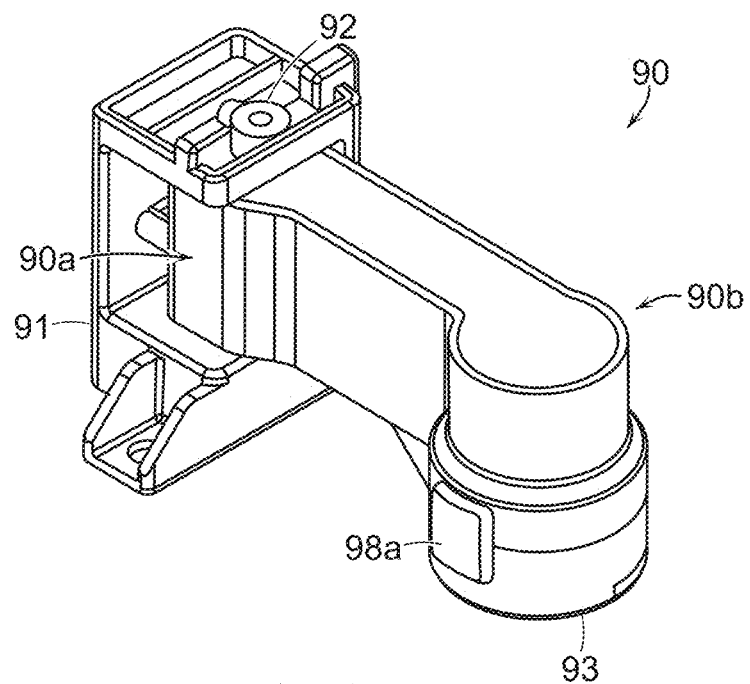
FIG. 4 is a top perspective view of a mounting arm of the beverage brewing apparatus of FIG. 1 in an operational position.
Figure 5:
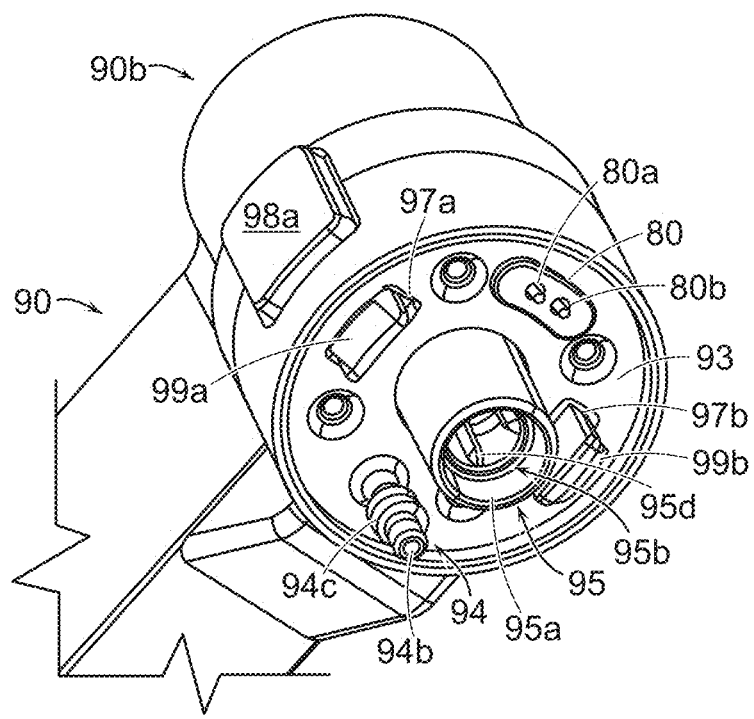
FIG. 5 is a bottom perspective view of the mounting arm of FIG. 4.
Figure 6:
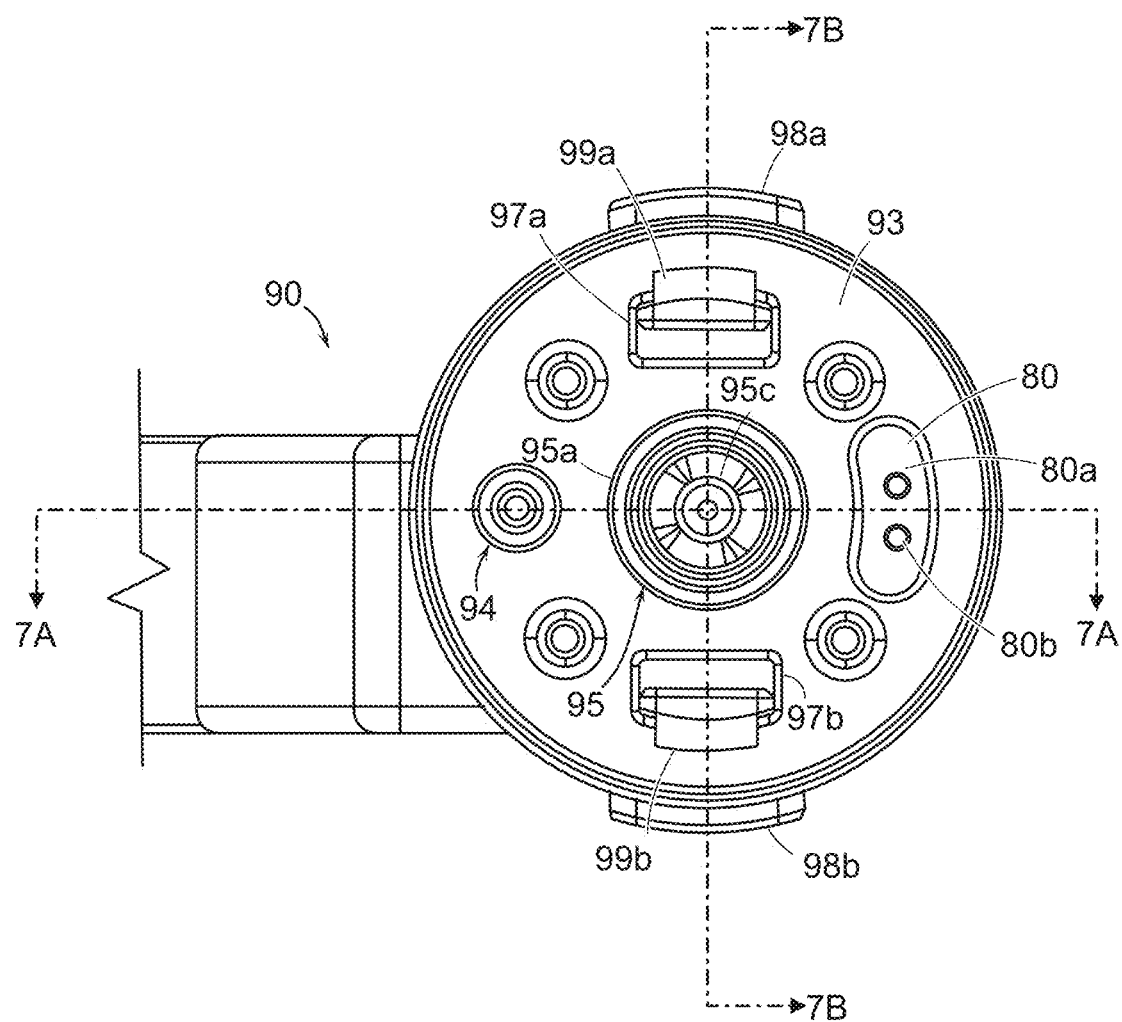
FIG. 6 is a bottom view of the mounting arm of FIG. 4.

As shown in more detail in FIGS. 4-6, the mounting arm 90 can have a generally elongate configuration with a first end 90a and a second end 90b. The first end 90a can be pivotally secured to a frame 91 at a pivot joint 92. The frame 91 can be arranged within the housing 24 and it can be configured to allow the mounting arm 90 to pivot between a storage position and an operational position. In the storage position, the mounting arm 90 is pivoted to be flush and/or to abut the housing 24, and in the operational position, the mounting arm 90 extends from the housing at a sustainably perpendicular angle to allow for a container to be arranged underneath a fluid texturing device 100 connected to the mounting arm 90.

The second end 90b of the mounting arm 90 can include a mating face 93 that defines a connecting feature. The connecting feature can have various input and output ports for passing material and signals to and from the fluid texturing device 100. The mating face 93 is configured to face downward and be perpendicular with a support surface such that the fluid texturing device 100 extends in a vertical direction when connected to the mounting arm 90. The various input and output ports on the mating face 93 of the mounting arm 90 can include a steam injection port 94, a driveshaft port 95, and an electric terminal 80. As shown in FIG. 6, the driveshaft port 95 can be arranged in the center of the mating face 93, and the steam injection port 94 and the electric terminal 80 can be radially spaced from the driveshaft port 95. Additionally, the mating face 93 can include features which are configured to selectively engage the fluid texturing device 100 to retain the fluid texturing device 100 on the mounting arm 90.

Figure 7A:
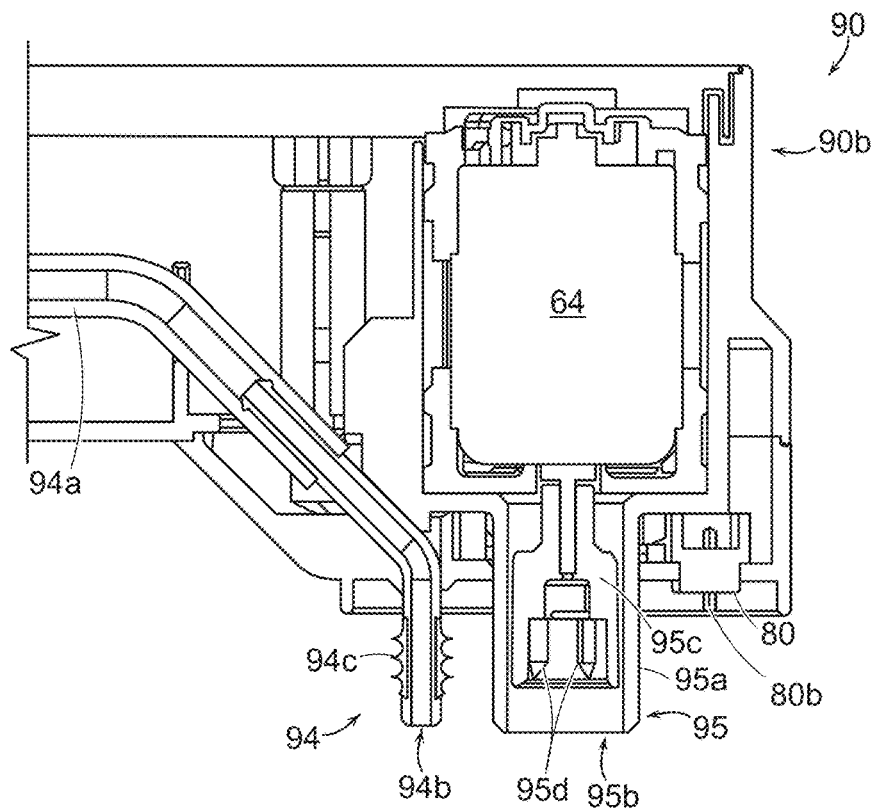
FIG. 7A is a cross-sectional side view of the mounting arm of FIG. 6 taken along line 7A-7A in FIG. 6.

The steam injection port 94 is shown in more detail in FIG. 7A and includes a tube 94a position within and extending through the mounting arm 90. The tube 94a extends outward and vertically downward from the mating face 93 and has an outlet 94b at a terminal end thereof. As steam exits the outlet 94b, steam will enter a steam injection tube of the fluid texturing device 100, which will be explained in more detail below. The outlet 94b can include a seal 94c arranged on the outer surface of the outlet 94b to help seal the outlet 94b with the steam injection tube of the fluid texturing device 100. In certain aspects, the seal 94c can formed from a deformable silicon material, but other types of seals are considered within the scope of this disclosure.

In order to produce steam at the fluid texturing device 100, the tube 94a can be configured to couple to a steam source 60 arranged within the housing 24, as shown in FIG. 3. The steam source 60 can be integral with the heater 48 or it can be a separate unit, and it can be configured to produce steam and transport that steam through the tube 94a to an outlet 94b. The steam source 60 can be in communication with the controller 58, which controls the amount and temperature of steam produced by the steam source 60. In certain aspects, the steam generated by the steam source 60 can be dry steam produced by heating the water contained within the reservoir 32. A pump can be used to move the steam from the steam source 60 to the steam injection port 94, or the pressure of the steam itself can be sufficient to move the steam from the steam source 62 the steam injection port 94.

Figure 7B:
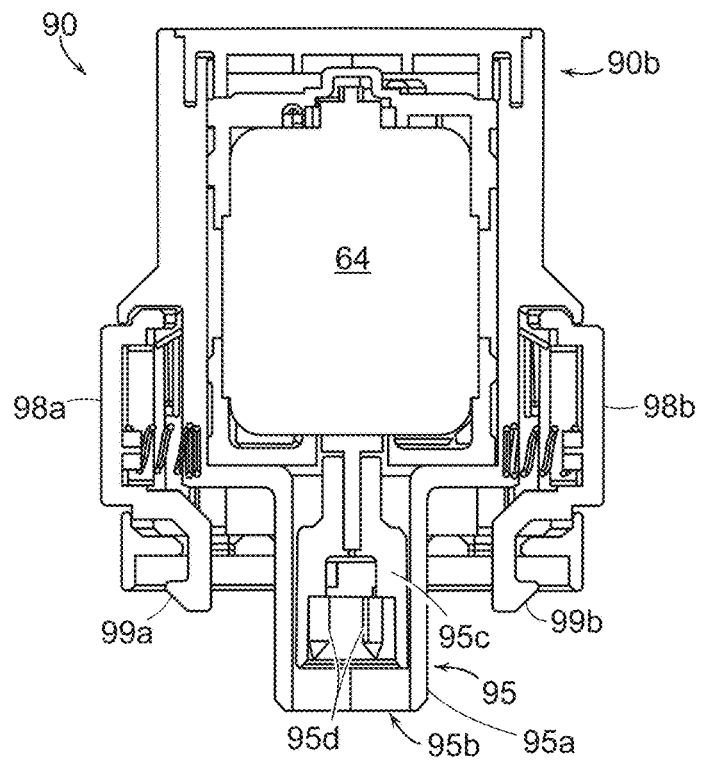
FIG. 7B is a cross-sectional side view of the mounting arm of FIG. 6 taken along line 7B-7B in FIG. 6.

As indicated above, the driveshaft port 95 is also arranged on the mating face 93 and it is configured to transmit rotational motion to the fluid texturing device 100. As illustrated in FIG. 7B, the driveshaft port 95 includes a hollow body 95a that extends outward from the mating face 93 and that has an aperture 95b arranged therein. A drive feature 95c is arranged within the hollow body 95a and is configured to drive rotational motion of a driveshaft of the fluid texturing device 100 when the fluid texturing device 100 is connected to the mounting arm 90, as will be explained in more detail below. In the illustrated embodiment, the drive feature 95c is in the form of multiple tabs, e.g., four tabs, that abut corresponding tabs on the driveshaft of the fluid texturing device 100. The tabs 95d can project vertically inward and can be oriented in a vertical direction along the internal surface of the hollow body 95a of the driveshaft port such that a driveshaft of the fluid texturing device 100 can be removed and replaced relative to the mounting arm 90 in the vertical direction, while still allowing for rotational motion to be transferred from the drive feature 95c to the driveshaft of the fluid texturing device 100. While four tabs are shown in the figures, more or less tabs would be sufficient and considered within the scope of this disclosure. The hollow body 95a can be connected to the driveshaft of a motor 64 arranged in the second end 90b of the mounting arm 90 such that the motor 64 can rotate the hollow body 95a. The motor 64 can be connected to the controller 58, which controls the rotational speed of the motor 64. In certain embodiments, the motor 64 can be a DC variable speed motor, where the controller 58 controls the output speed depending on a desired fluid texture, as explained in more detail below.

As further show in FIGS. 5-7B, an electrical terminal 80 can be arranged on one side of the driveshaft port 95 opposite to the steam injection port 94. The illustrated electric terminal 80 includes pogo pins 80a, 80b, which are configured to contact corresponding electrical contacts on the fluid texturing device 100, explained in more detail below. The pogo pins 80a, 80b extend downward from the mating face 93 and can retract vertically into the mating face 93 when contacting corresponding electrical contacts on the fluid texturing device 100. The pogo pins 80a, 80b are connected to the controller 58 and may be configured to send signals to the controller 58 based on various operating conditions of the fluid texturing device 100, such as the temperature of the fluid surrounding the fluid texturing device 100, the speed of the whisk, or the connection status of the fluid texturing device 100. Even though the electric terminal 80 is represented as having multiple pogo pins, any type of electrical connector would be sufficient and considered within the scope of this disclosure.

As indicated above, the mounting arm 90 can also include a mating feature configured to removably engage the fluid texturing device to retain the device on the brewing apparatus. In the illustrated embodiment, the mating feature is in the form of tabs 99a, 99b that project outward from the mating face 93 and that are configured to engage with corresponding connecting features within the fluid texturing device 100, which will be explained in more detail below. The illustrated tabs 99a, 99b extend through slots 97a, 97b in the mating face and are deflectable to allow the tabs 99a, 99b to move radially inward and outward. Buttons 98a, 98b can be arranged on the exterior surface of the second end 90b of the mounting arm 90 and can be integral with or connected to the tabs 99a, 99b. The buttons 98a, 98b can be spring biased outward such that the tabs 99a, 99b are likewise biased radially outward, thus retaining the fluid texturing device on the brewing apparatus. During attachment of the fluid texturing device to the mounting arm, the device can cause the tabs 99a, 99b to deflect radially inward and once fully connected, the tabs will return to the radially outward position. Further, a force can be applied to the buttons 98a, 98b to move the buttons radially inward to cause the tabs 99a, 99b to move radially inward, thereby releasing the fluid texturing device 100 from the mating face 93.

As stated above, the fluid texturing device 100 is configured to be removably arranged on the mounting arm 90. An exemplary embodiment of a fluid texturing device 100 is illustrated in FIGS. 8-10B. As shown, the fluid texturing device 100 generally includes a hollow elongate housing 102 having steam injection tube 118 and a driveshaft 116 extending therethrough. The steam injection tube 118 is configured to deliver steam to a fluid, and the driveshaft 116 includes a whisk on the terminal end thereof for mixing the fluid.

The housing 102 can have a variety of configurations, but in the illustrated embodiment the hollow elongate housing 102 has a first end 102a and a second end 102b. The first end 102a can have a mating portion that allows multiple inputs and outputs of the fluid texturing device to communicate with the components within the beverage brewing apparatus 10, and the second end 102b can interact with the fluid. In the illustrated embodiment, the first end 102a is generally circular while the second end 102b has an oval-shaped cross-section, and the portion of the housing 102 extending there between has an oval-shaped cross-section.

The mating portion of the housing 102 can include various features for mating with the connecting features on the mounting arm of the beverage dispensing apparatus. In particular, similar to mating face 93, the housing 102 can have a mating face 106 that includes a steam injection port 110, a driveshaft port 112, an electric terminal 86, and mating grooves 114a, 114b, each of which will be discussed in more detail below. The mating face 106 can also include mating grooves 114a, 114b arranged on opposite sides of the driveshaft port 112, and configured to receive the corresponding tabs 99a, 99b on the mounting arm.

The steam injection port 110 is configured to fluidly mate with the steam injection port 94 on the mounting arm in order to transfer steam from the steam source 60 within the housing 24 through the steam injection tube 118, which extends from the first end 102a of the housing 102 to the second end 102b of the housing. The steam injection tube 118 can be in the form of a circular tube having an inner lumen that allows steam to pass from the steam injection port 110 to an outlet 122 arranged within a tip 120. In certain aspects, the steam injection tube 118 or the inner lumen thereof can be tapered from the first end 102a to the second end 102b. The tapered configuration can aid in reducing back pressure as steam travels along the steam injection tube 118. The tip 120 can be positioned adjacent the second end 102b of the housing 102 for ejecting steam into a fluid. In one embodiment, the tip 120 can be formed from a separate component that is screwed onto the steam injection tube 118. However, in other aspects it can be integral with the tube 118. A person skilled in the art will appreciate that the steam injection tube can be in the form of a lumen extending through and integrally formed with the housing, and need not be in the form of a separate tube extending through the housing.

Figure 13:
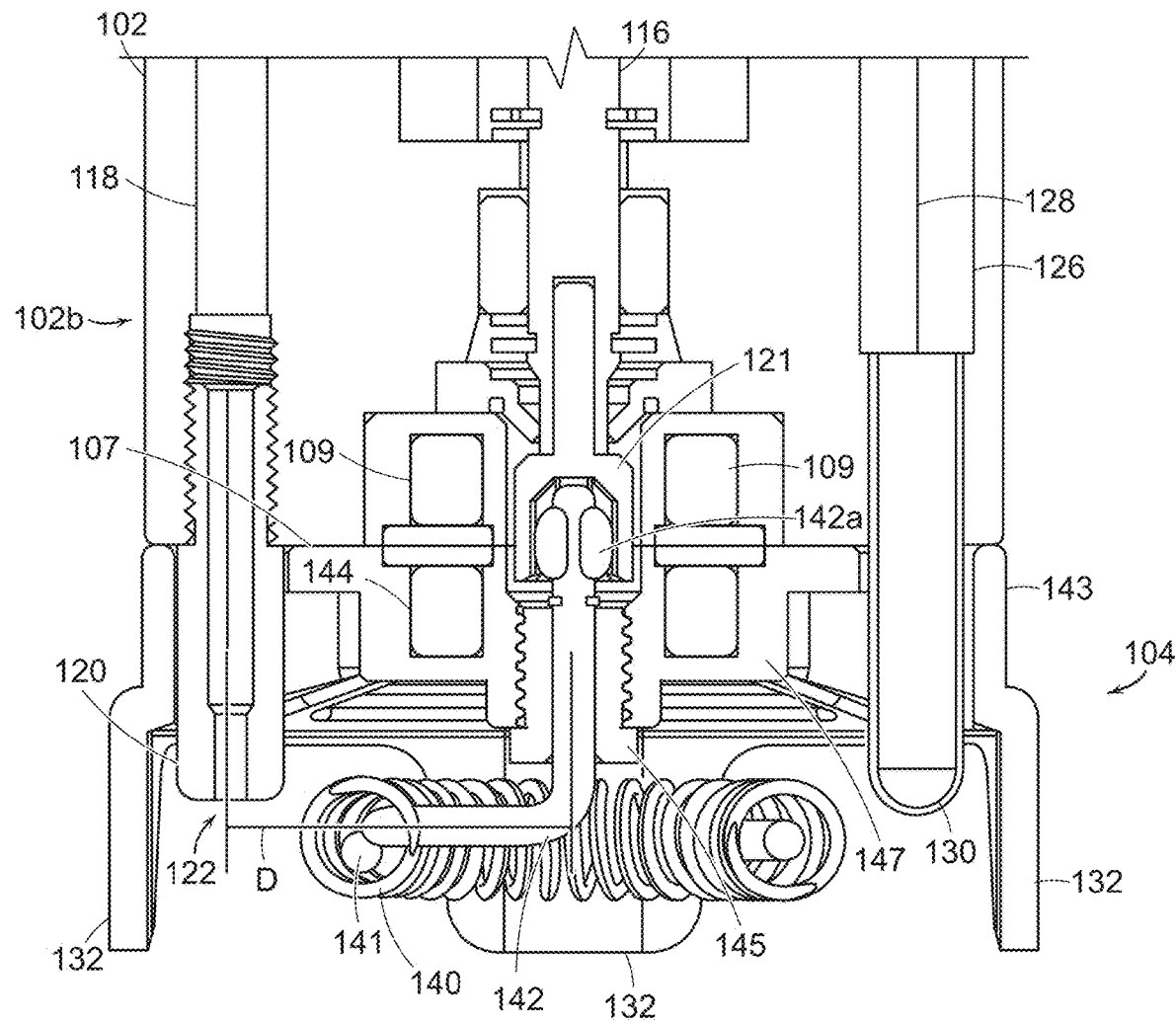
FIG. 13 is a cross-sectional side view of the fluid texturing device of FIG. 9.
Figure 15:
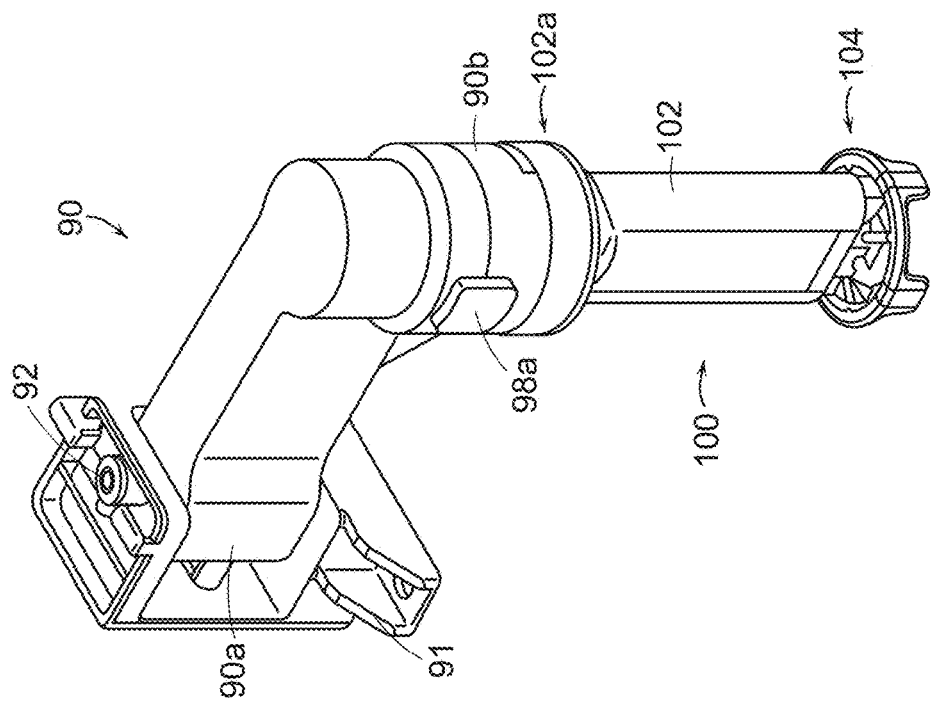
FIG. 15 is a top perspective view of the fluid texturing device of FIG. 14 connected to the mounting arm.
Figure 24:
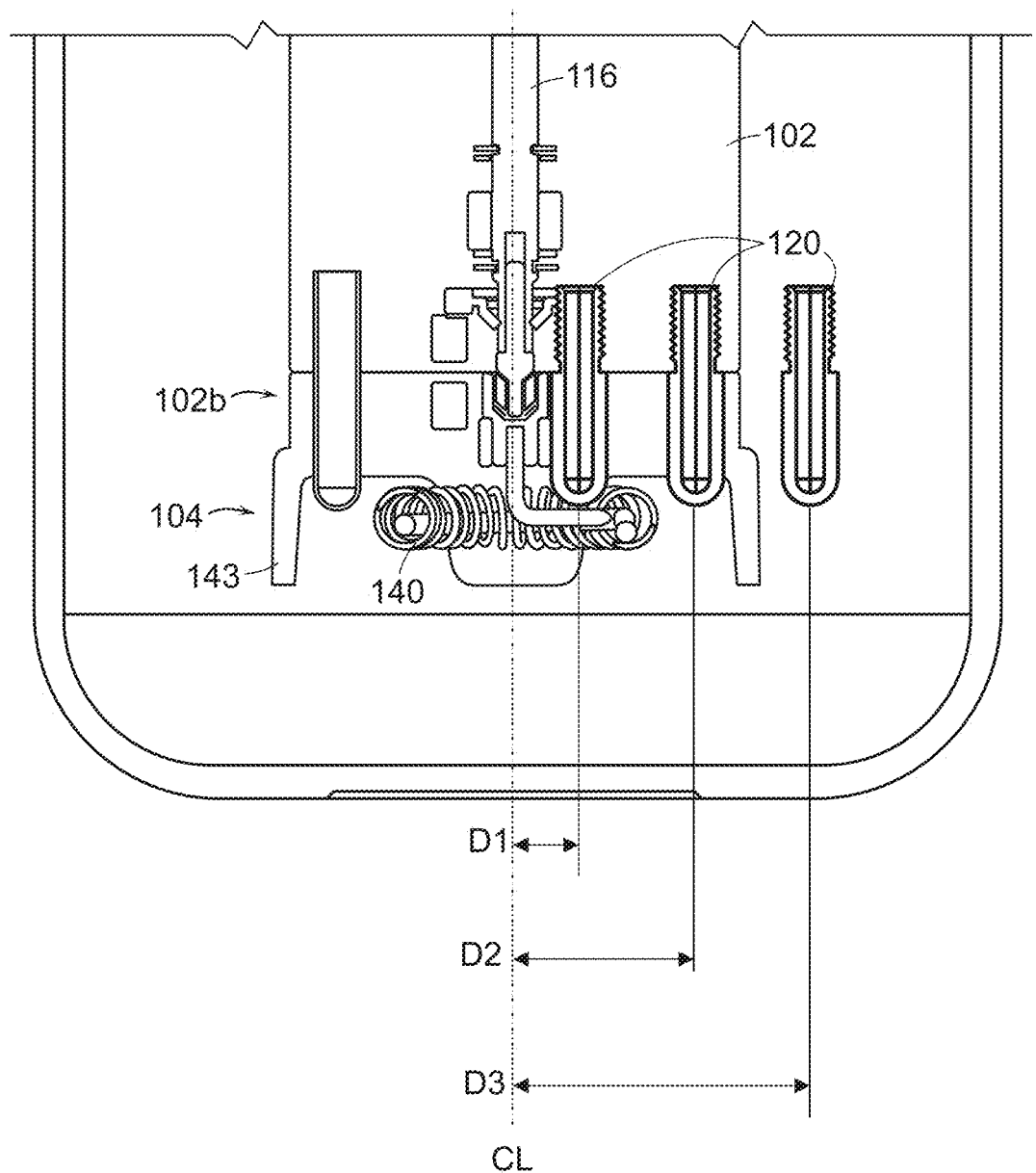
FIG. 24 is a cross-sectional view of the fluid texturing device of FIG. 8 having different locations for a steam outlet.

The position of the steam injection tube 118 and the tip 120 can vary to control the impact on fluid, as will be discussed in further detail below. In one embodiment, the steam injection tube 118 is spaced a distance from the driveshaft 116 to position the tip 120 and outlet 122 a distance apart from the whisk. In one embodiment, as shown in FIG. 13, a distance D between the tip 120 and the driveshaft 116, is 14.46 mm. Additionally, in further aspects illustrated in FIG. 24, the tip 120 can spaced from the driveshaft 116, extending along a centerline CL, at different distances in a range of about 5.00 mm to 32.00 mm. In one aspect, a distance D1 between the tip 120 and the driveshaft 116 is 6.00 mm such that the tip 120 is configured to inject steam inside an inner most portion of the whisk 140. In another aspect, a distance D2 between the tip 120 and the driveshaft 116 is 14.46 mm such that tip 120 is configured to eject steam radially between an outer most portion of the whisk 140 and an inner most portion of the whisk cover 143. In another aspect, a distance D3 between the tip 120 and the driveshaft 116 is 30.00 mm such that the tip 120 is configured to eject steam radially outside of an outer most portion of the whisk cover 143. Further, the tip 120 of the tube 118 can be arranged to be positioned vertically above the whisk 140 to better incorporate air and steam into a fluid being agitated by the whisk 140, as will also be explained in more detail below.

Figure 8:
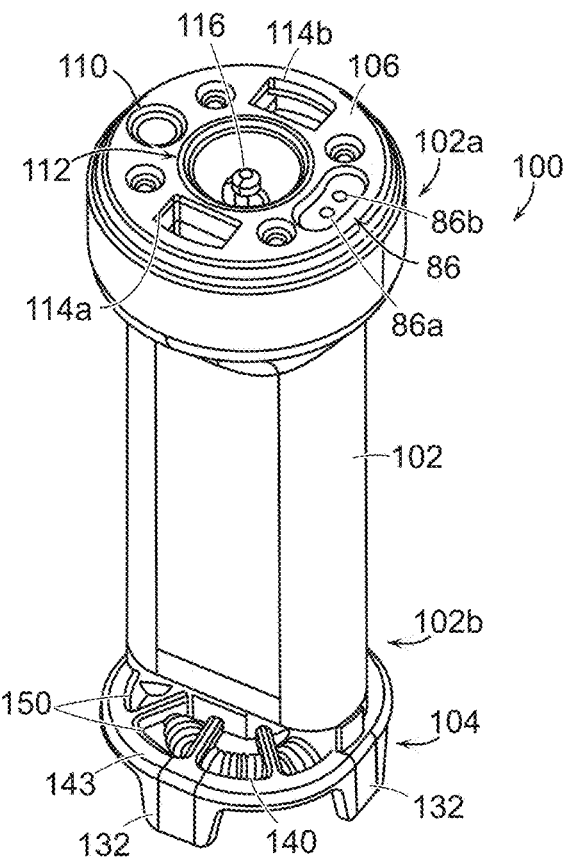
FIG. 8 is a top perspective view of the fluid texturing device of FIG. 2 detached from the beverage brewing apparatus.
Figure 9:
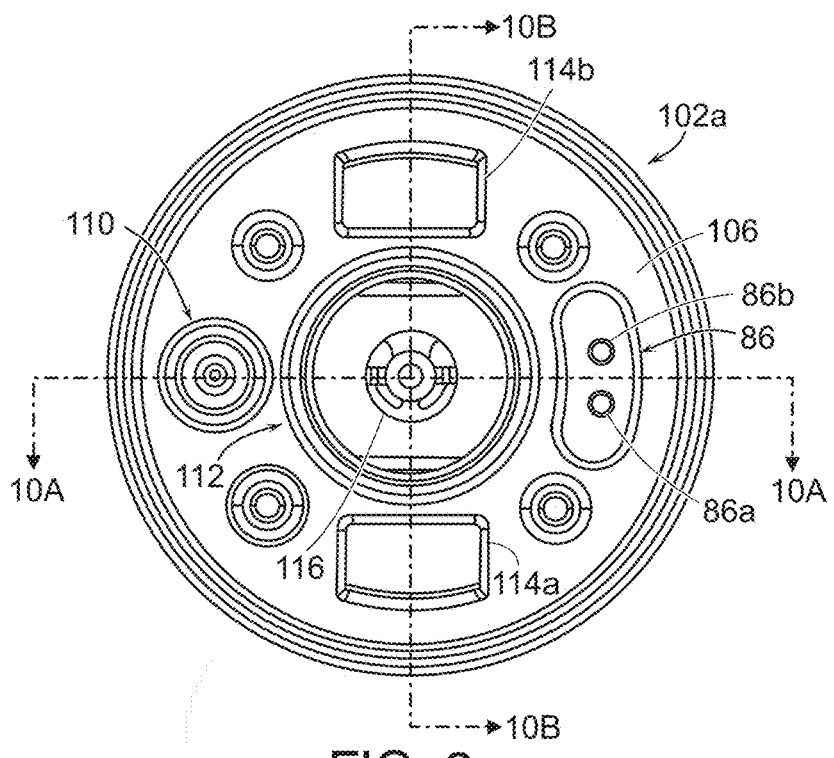
FIG. 9 is a top view of the fluid texturing device of FIG. 8.

As further shown in FIGS. 8 and 9, the mating face 106 can also include an electrical terminal 86 arranged thereon and positioned on a side of the driveshaft port 112 that is opposite to the steam injection port 110. Similar to the electrical terminal 80 on the mating face 93, the electrical terminal 86 on the mating face 106 of the fluid texturing device 100 can include pogo pins 86a, 86b, which correspond to the pogo pins 80a, 80b. When the fluid texturing device 100 is connected to the connecting arm 90, pogo pins 80a, 80b contact pogo pins 86a, 86a such that signals from the temperature sensor 130 can be sent to the controller 58 within the housing 24 of the beverage brewing apparatus 10. A tube 126, as shown in FIG. 10A, can extend from the electrical terminal to the second end 102b of the housing 102. A person skilled in the art will appreciate that the tube can be in the form of a lumen integrally formed with the housing, and that it need not be a separate component. The tube 126 can be configured to carry a wire 128 there through for transferring signals from the electrical terminal 86 to a temperature sensor 130 arranged adjacent to the outlet of the tube 126. In certain aspects, the temperature sensor 130 can be a negative temperature coefficient (NTC) sensor, which can detect a temperature of fluid surrounding the temperature sensor 130. The temperature sensor 130 can extend outward and vertically downward from the housing 102, similar to the tip 120.

Figure 16B:
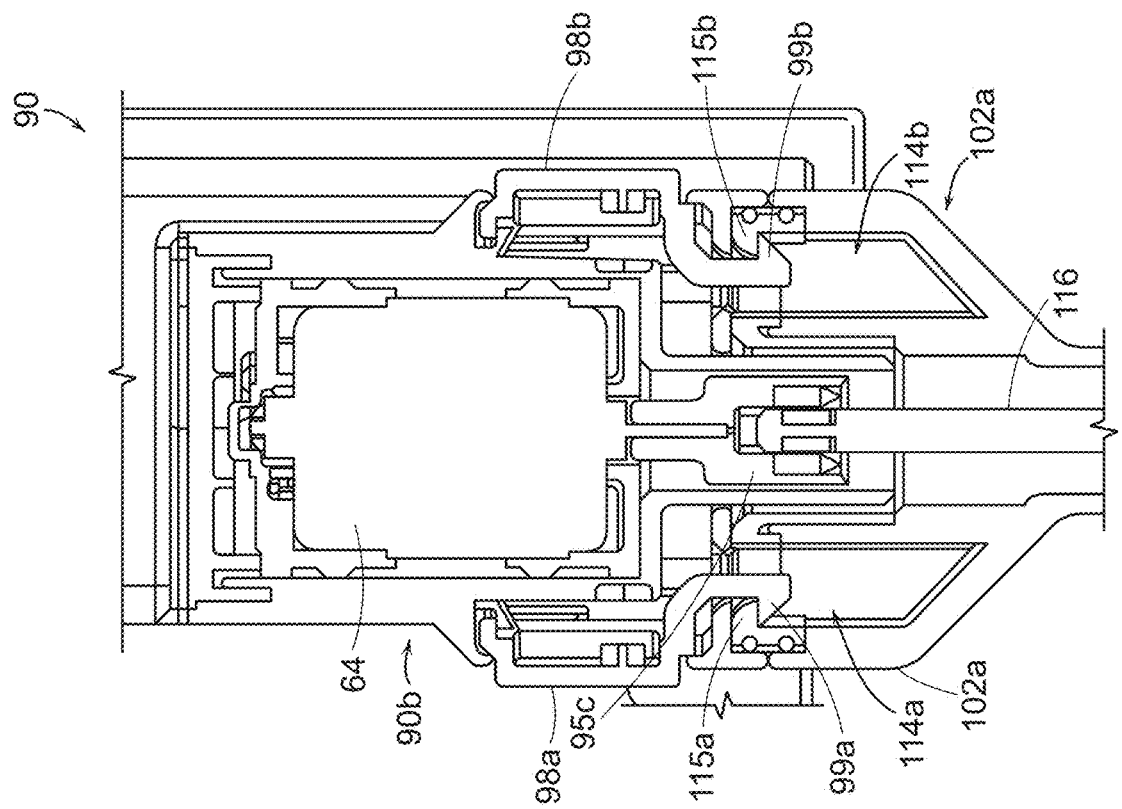
FIG. 16B is a cross-sectional side view of the mounting arm and fluid texturing device of FIG. 15.
Figure 16A:
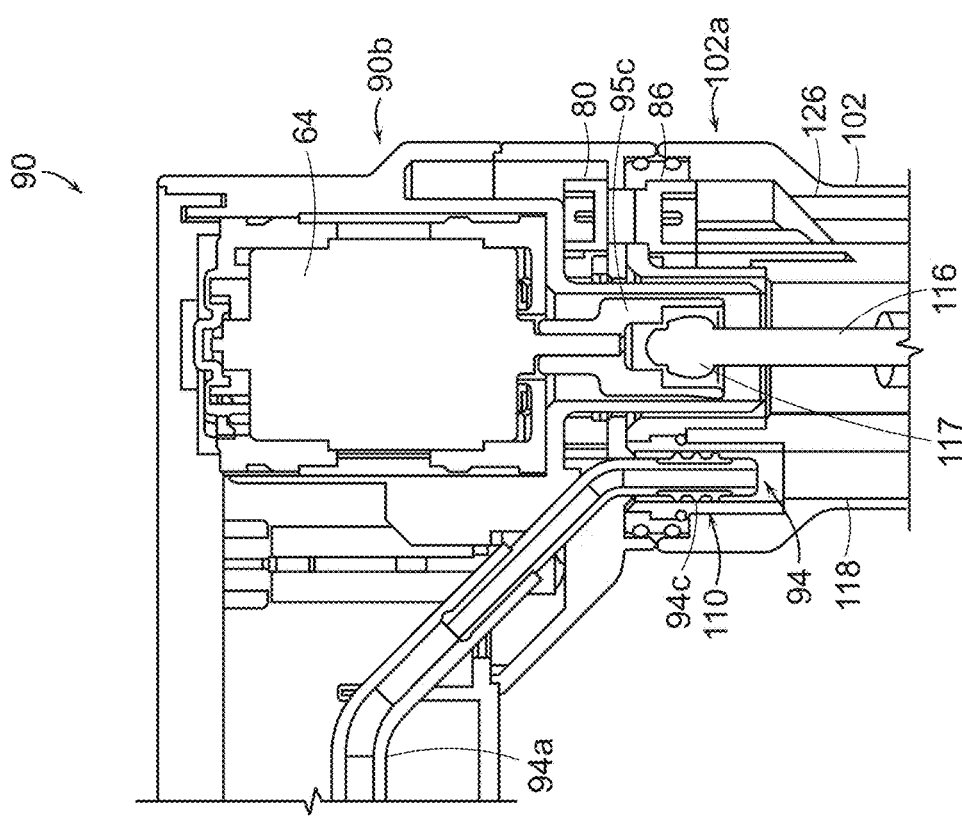
FIG. 16A is a cross-sectional side view of the mounting arm and fluid texturing device of FIG. 15.

As indicated above, the mating face 106 of the fluid texturing device 100 can also include a driveshaft port 112 arranged centrally within the housing 102. The driveshaft 116 can be mounted within the driveshaft port 112 such that it is configured to receive rotational motion from the motor 64 arranged within the mounting arm 90. The driveshaft 116 is secured within the housing by snap rings which are positioned such that the driveshaft 116 is prevented from moving in the vertical axis. The driveshaft 116 can extend through the housing 102 from the first end 102a to the second end 102b. In certain aspects, the driveshaft 116 can be parallel to both the steam injection tube 118 and tube 126. In order to allow rotational motion to be transmitted to the driveshaft 116, the driveshaft 116 can include one or more tabs 117 at the first end 102a. The end portion of the driveshaft having the tabs 117 can extend into the driveshaft port 112. When the fluid texturing device 100 is mated to the mounting arm, the driveshaft port 95 on the mounting arm will extend into the driveshaft port 112 on the fluid texturing device 100 as illustrated in FIGS. 16A-16B. As a result, the tabs 117 on the driveshaft 116 can contact the tabs 95d on the mounting arm to allow the driveshaft 116 to be rotatably driven.

Figure 11:
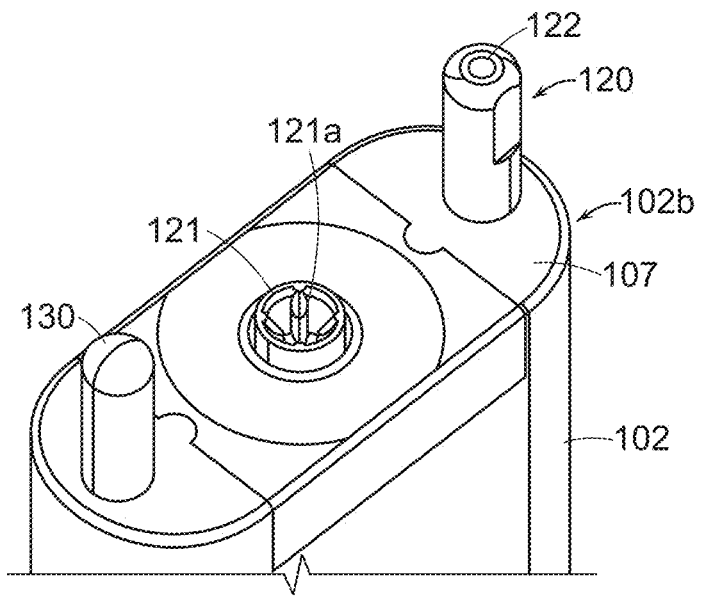
FIG. 11 is a bottom perspective view of the fluid texturing device of FIG. 9, showing a whisk body detached.

As shown in FIG. 10A-10B, the second end 102b of the driveshaft 116 can include a connecting feature 121 that is arranged on the end of the driveshaft 116. In certain aspects, as shown in FIG. 11, the connecting feature 121 can be in the form of a cylindrical-shaped body with a hollow cavity. An opening arranged on the bottom surface of the connecting feature 121 allows for access to the interior of the hollow body. The connecting feature 121 can also include tabs 121a disposed therein that are configured to translate rotational motion from the driveshaft 116, as discussed further below. In certain aspects, the tabs 121a extend in the vertical direction along an inner surface of the connecting feature 121 such that a corresponding driveshaft can be removed and replaced within the connecting feature 121 relative to the housing 102 in the vertical direction, while still allowing for rotational motion to be transferred from the driveshaft 116 through the connecting feature 121.

Figure 14:
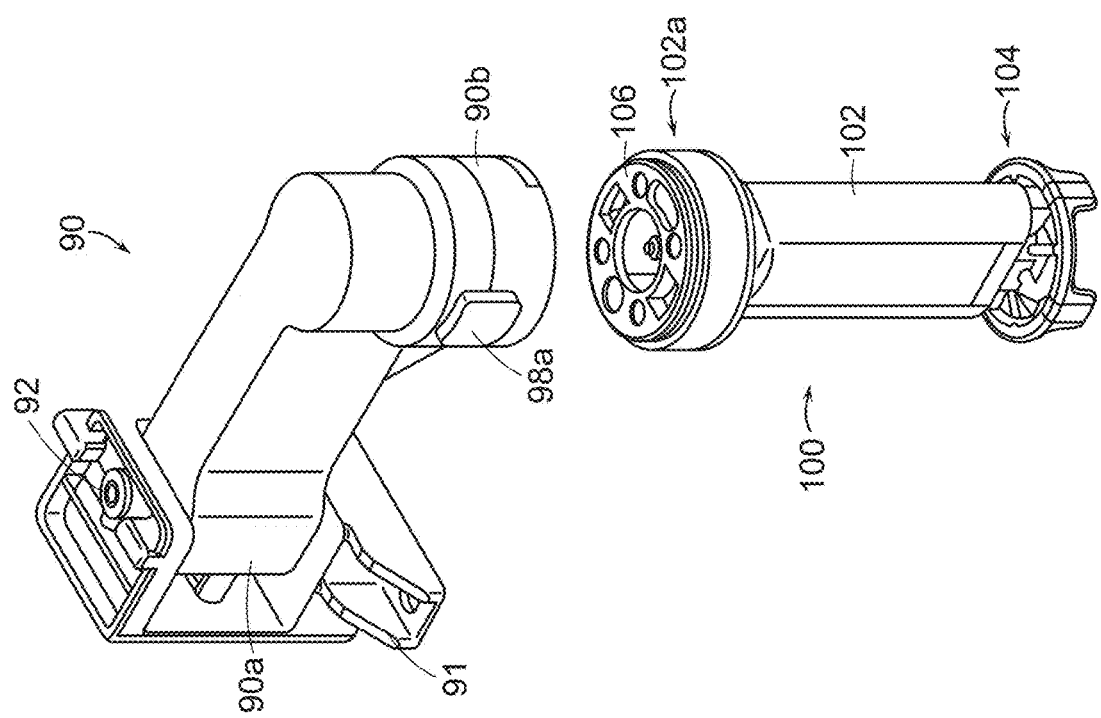
FIG. 14 is top perspective view of the mounting arm of FIG. 4 showing the fluid texturing device of FIG. 9 about to be coupled thereto.

Referring back to FIGS. 8 and 9, in order to secure the fluid texturing device 100 to the mounting arm 90, the mating face 106 can further include mating grooves 114a, 114b that correspond to the tabs 99a, 99b on the mounting arm 90. The mating grooves 114a, 114b are arranged on opposite sides of the driveshaft port 112, and extend downward into the housing 102. The mating grooves 114a, 114b can have a shape and size that corresponds to a shape and size of the tabs 99a, 99b. As illustrated in FIG. 14, the mating grooves 114a, 114b can each have a flange 115a, 115b formed therein that is engaged by the tabs 99a, 99b when the tabs 99a, 99b are inserted into the mating grooves 114a, 114b. As stated above, in order to remove the tabs 99a, 99b from the mating grooves 114a, 114b, the tabs 99a, 99b are displaced radially inward by the buttons 98a, 98b, dislodging the tabs 99a, 99b from the flanges 115a, 115b.

In order to act upon fluid surrounding the fluid texturing device 100, the fluid texturing device 100 further includes a whisk assembly 104 removably coupled to the second end 102b of the housing 102, as illustrated in FIGS. 8, 10A-10B, and 12-13. The whisk assembly 104 generally includes a whisk 140, a driveshaft 142, and a whisk cover 143. The whisk cover 143 can have a variety of configurations, but in general it is configured to surround the whisk 140. In certain aspects, the whisk cover 143 can have a frusto-conical shape extending radially outward from the housing 102. The whisk cover 143 can include tabs 132 arranged at an outer circumference thereof and extending downward from the whisk cover 143. The tabs 132 can act as spacers in order to create space between the bottom of the fluid container so that the whisk 140 does not contact the bottom of the fluid container. The tabs 132 can thus have a height that is greater than a height of the whisk 140. Gaps can exist between each of the tabs 132 in order to allow fluid to pass between the tabs 132 to interact with the whisk 140. In addition to the tabs 132, the whisk cover 143 can include at least one or a plurality of aperture(s) 150 arranged in the top surface thereof. As will be explained in detail below, the apertures 150 can allow air to interact with the whisk 140.

Figure 12:
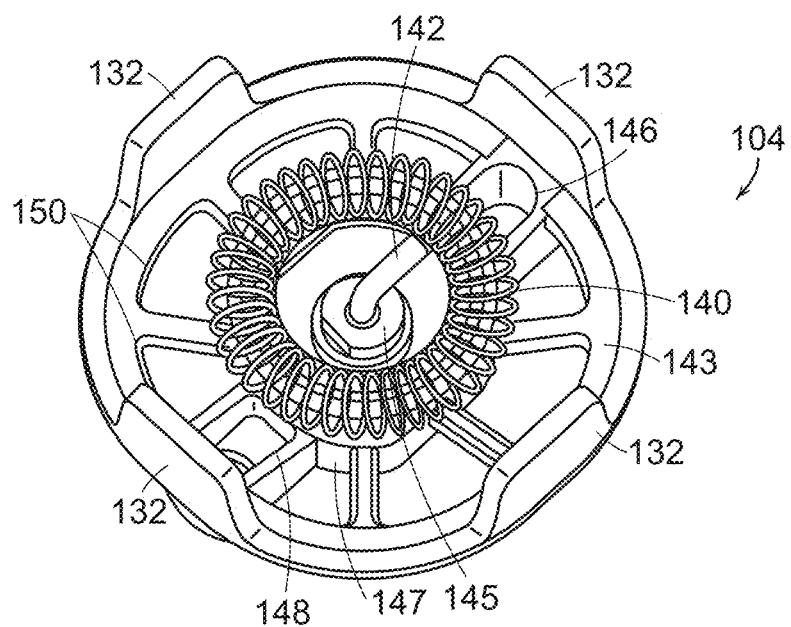
FIG. 12 is a bottom perspective view of the whisk body of FIG. 9 detached from the fluid texturing device.
Figure 12A:
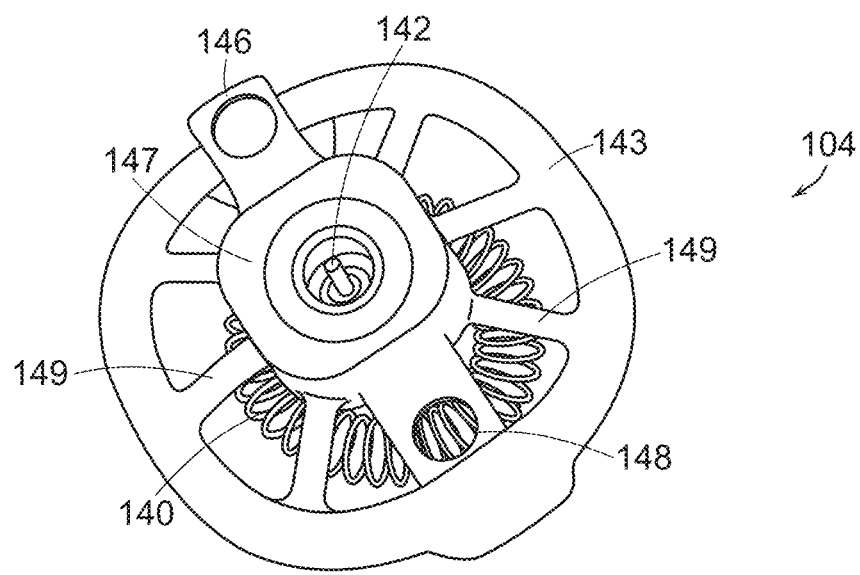
FIG. 12A is a top perspective view of the whisk body of FIG. 9 detached from the fluid texturing device.
Figure 12B:
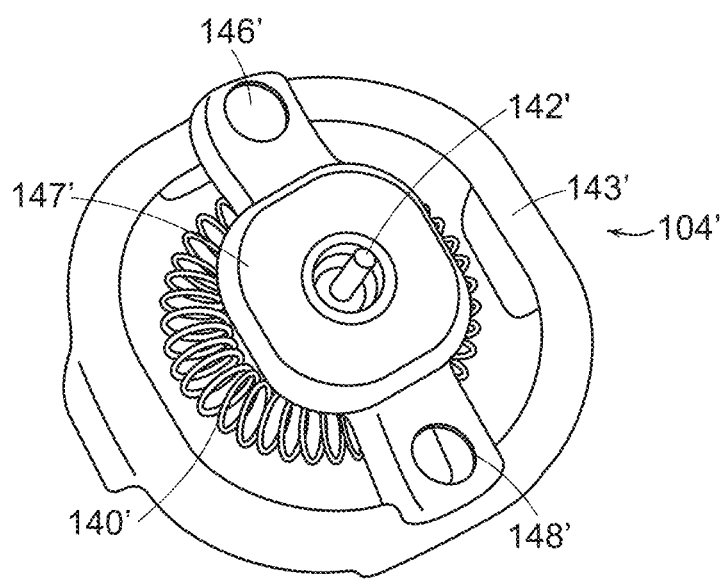
FIG. 12B is another embodiment of a whisk body without vanes shown detached from the fluid texturing device.

The whisk cover 143 can also include separate apertures 146, 148 which can be separated by vanes 149, as illustrated in FIGS. 12 and 12A. The illustrated vanes 149 extend radially outward from a central housing 147 of the whisk cover 143. However, the whisk cover can include any number of vanes positioned at any location, or in other embodiments it can lack vanes entirely as shown in FIG. 12B. Where vanes are present, the apertures 146, 148 can be positioned to allow the tip 120 of the steam injection tube 118 and the temperature sensor 130 to pass through the whisk cover 143 such that the tip 120 and a temperature sensor 130 can be arranged adjacent to the whisk 140.

FIG. 12B illustrates one embodiment of a whisk assembly 104' which lacks any vanes. The whisk assembly 104' is substantially similar to the whisk assembly 104. Therefore, similar components will not be described in detail. The whisk assembly 104' generally includes a whisk 140', a driveshaft 142', a whisk cover 143', aperture 146', a central housing 147', and aperture 148'. As shown, there are no vanes extending between the central housing 147' and the whisk cover 143', besides the portions where the apertures 146', 148' are arranged.

In order to secure the whisk assembly 104 to the housing 102, the whisk cover 143 can include attachment members 144 which mate with corresponding attachment members 109 in the housing 102. As illustrated in FIG. 13, in one embodiment, the attachment members can be in the form of magnetic elements. For example, the housing 102 can include one or more magnets 109 arranged in the bottom surface 107 and the whisk cover 143 can likewise include one or more magnets 144 arranged therein and aligned with the magnets 109 in the housing 102. The magnets 144 in the whisk cover 143 can be disposed within a central housing 147 of the whisk cover. The central housing 147 can also retain the driveshaft 142 therein, as will be discussed further below. The magnets 144 can circumferentially surround the driveshaft 142 to aid in aligning the driveshaft 142 with the drive connecting feature 121 on the housing 102. In particular, when the whisk assembly 104 is magnetically engaged to the housing 102, the tip 120 and the temperature sensor 130 will pass through the whisk cover 143, and the driveshaft 142 will align with and extend into the connecting feature 121.

As illustrated in FIGS. 12 and 13, the driveshaft 142 is rotatably disposed within the central housing 147 in the whisk cover 143. A bearing 145 can be disposed within the central housing 147 around the driveshaft 142 for retaining the driveshaft 142 within the cover 143, while allowing the driveshaft 142 to rotate relative to the whisk cover 143. The top end of driveshaft 142 can be similar to driveshaft 116, and can include tabs 142a configured to interact with the tabs 121 on driveshaft 116, thus allowing the tabs 121 on driveshaft 116 to transfer a rotational force to the tabs 142*a* on the driveshaft 142. The driveshaft 142 can extend downward from the bearing 145, and can include a 90° bend to allow a terminal end of the driveshaft 142 to mate to the whisk 140.

In order to mate the driveshaft 142 to the whisk 140, the terminal end of the driveshaft 142 can form a hoop 141, thus allowing the whisk 140 to be mounted on the hoop. The whisk 140 can be in the form of a coiled metal spring arranged around the hoop 141 to create a torus-like shape. In one aspect, in addition to being a coiled metal spring, designs for the whisk can include other embodiments, including vanes, paddles, and other wired configurations such as balloon, French, ball, flat, spiral, and conical whisks. As best shown in FIG. 13, the driveshaft 142 can be configured to position the whisk 140 at least partially downward of the tip 120 and the temperature sensor 130, but above the bottom surface of the tabs 132 so as to prevent the whisk 140 from contacting the bottom surface of a fluid container.

Figure 18:
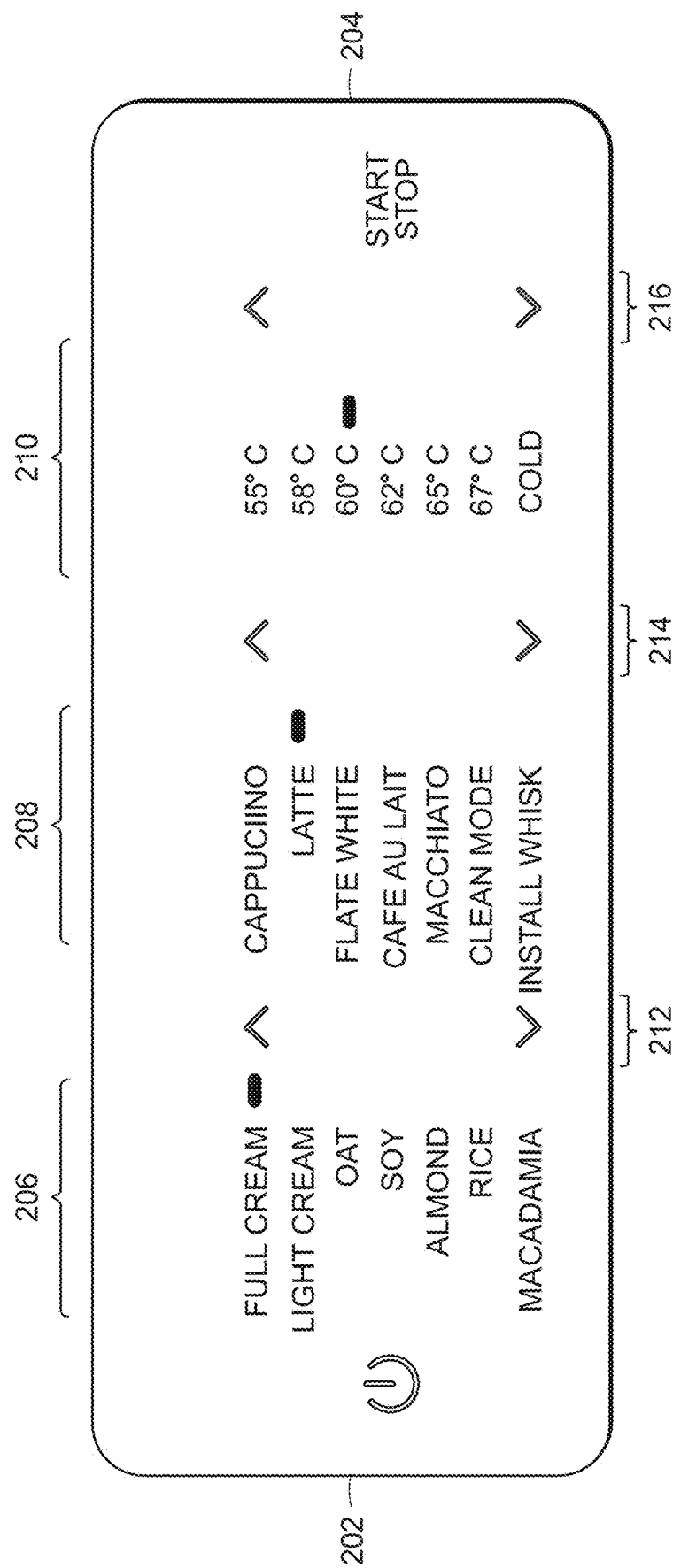
FIG. 18 is a schematic view of one embodiment of a user interface of the beverage brewing apparatus of FIG. 1.

In order to control operation of the beverage brewing system, a user interface can be used to input the desired fluid texture to be produced. FIG. 18 illustrates one embodiment of a user interface 200. As shown, the illustrated user interface 200 includes a power button 202, a start-stop button 204, a fluid type interface 206, a texture type interface 208, and a temperature level interface 210. The user interface can be connected to a processor which in turn controls the steam source and whisk motor. In certain aspects, the fluid type interface 206 can represent different variants of milk and milk-like substitute fluids. Since different milk types have different properties, such a density, the type of fluid being textured should be selected for an optimal fluid texture. The type of fluid can be altered using the controls 212 arranged on the user interface 200. The fluid type texture interface 208 can be used to determine the level of fluid texture that is desired. For example, it may be desirable to have more foam in a cappuccino when compared to a macchiato. The type of texture desired can be altered using the controls 214 arranged on the user interface 200. Additionally, the desired fluid temperature can be selected by the temperature level interface 210, and altered by the controls 216 arranged on the user interface 200. Using the inputs from the interfaces 206, 208, 210, the proper fluid texture can be achieved automatically by letting the system run a predetermined program including whisk speed and steam input over a timeframe.

Figure 19:
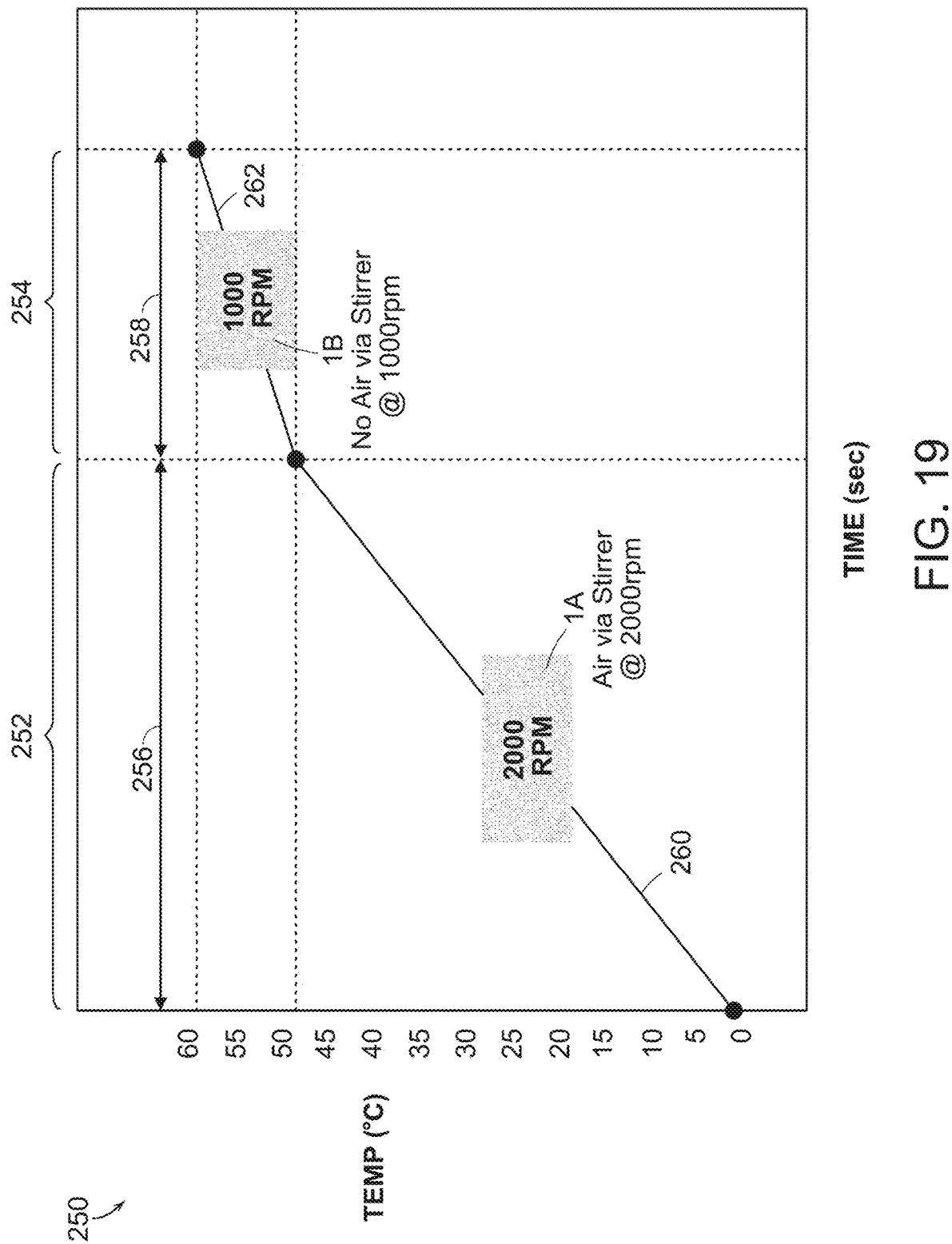
FIG. 19 is a graph showing an operational process of the fluid texturing device of FIG. 9.

In order to achieve a desired fluid texture, the fluid texturing device can be required to operate in different phases having different rotations per minute (RPMs). An example of a texturing process having different phases is depicted in FIG. 19. The graph 250 depicts a fluid texturing process including a first phase 252 the second phase 254. The line 256 represents the time duration of the first phase 252, and the line 258 represents the time duration of the second phase 254. It is important to note that the time duration of each phase can vary depending on the desired fluid texture. Line 260 represents the increase in temperature of a fluid being textured over time in the first phase 252. Line 262 represents the increase in temperature of the fluid being textured over time in the second phase 254.

Figure 20:
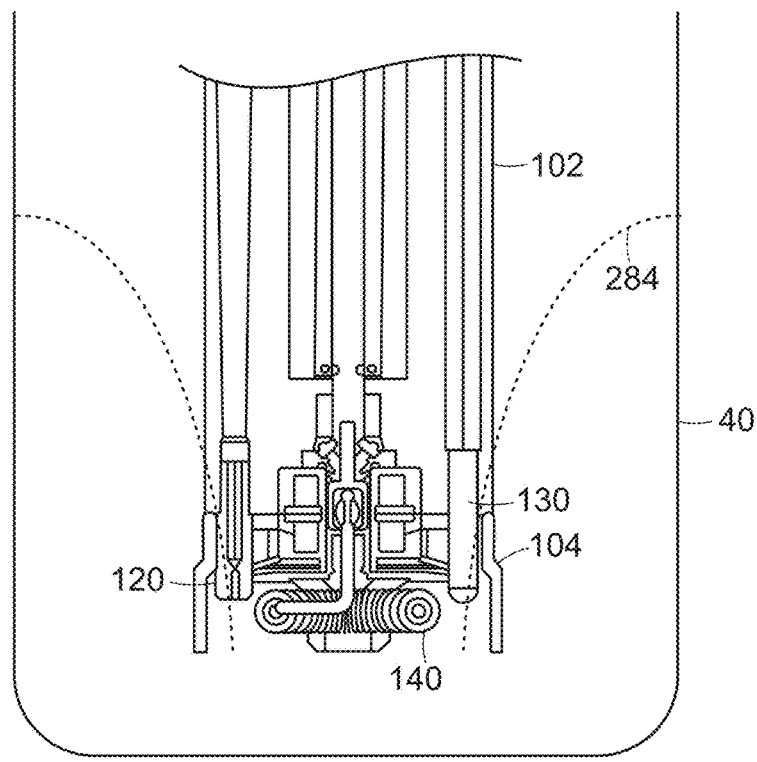
FIG. 20 is a cross-sectional side view of the fluid texturing device of FIG. 9 shown in use creating a first vortex within a fluid.
Figure 21:
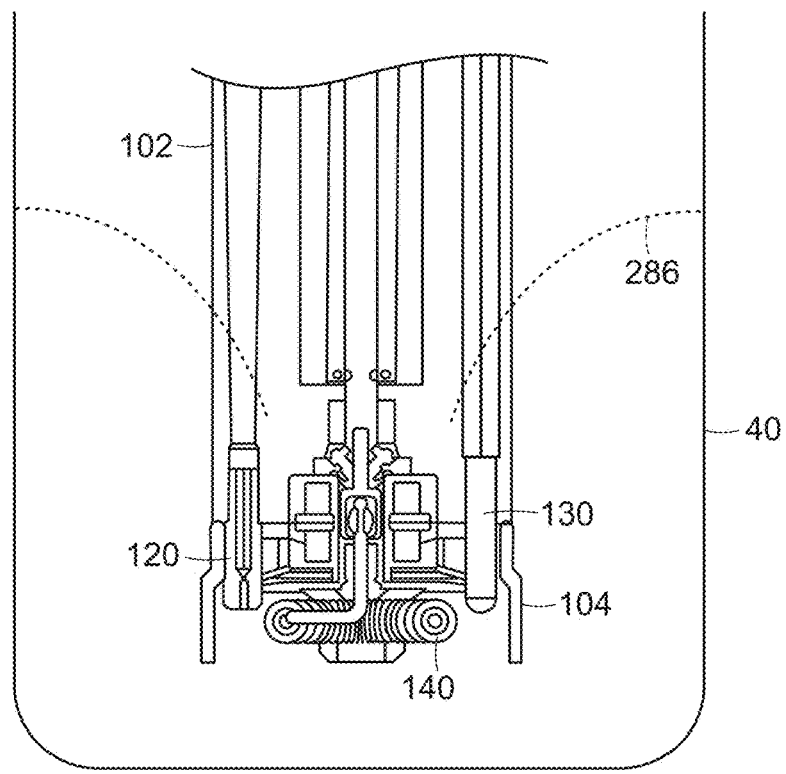
FIG. 21 is a cross-sectional side view of the fluid texturing device of FIG. 20 shown in use creating a second vortex within the fluid.

During a fluid texturing process, fluid, such as water, retained in the reservoir 32 is pumped into the steam source 60, where it is evaporated and guided as steam under pressure through dedicated tubing 94*a* to the steam injection tube 118 and outlet 122 within the removable whisk cover 143. Steam continually passes through the steam injection tube 118 and exits via the outlet 122 in the tip 120 where it is delivered into the fluid within the fluid container 40. Simultaneously, as steam is delivered via the steam injection tube 118, the whisk 140 is driven by the motor 64 to form a fluid vortex within the container 40. As depicted in graph 250, during a first phase 252, the whisk rotates at, e.g., 2000 RPM. This high rotational speed of the whisk 140 creates a deep vortex 284 within a fluid container 40, as illustrated in FIG. 20. In certain aspects, the fluid container 40 can include a lid having an aperture (described below) which allows the housing 102 to pass into the container 40, but prevents spills out of the container during a texturing process.

Figure 22:
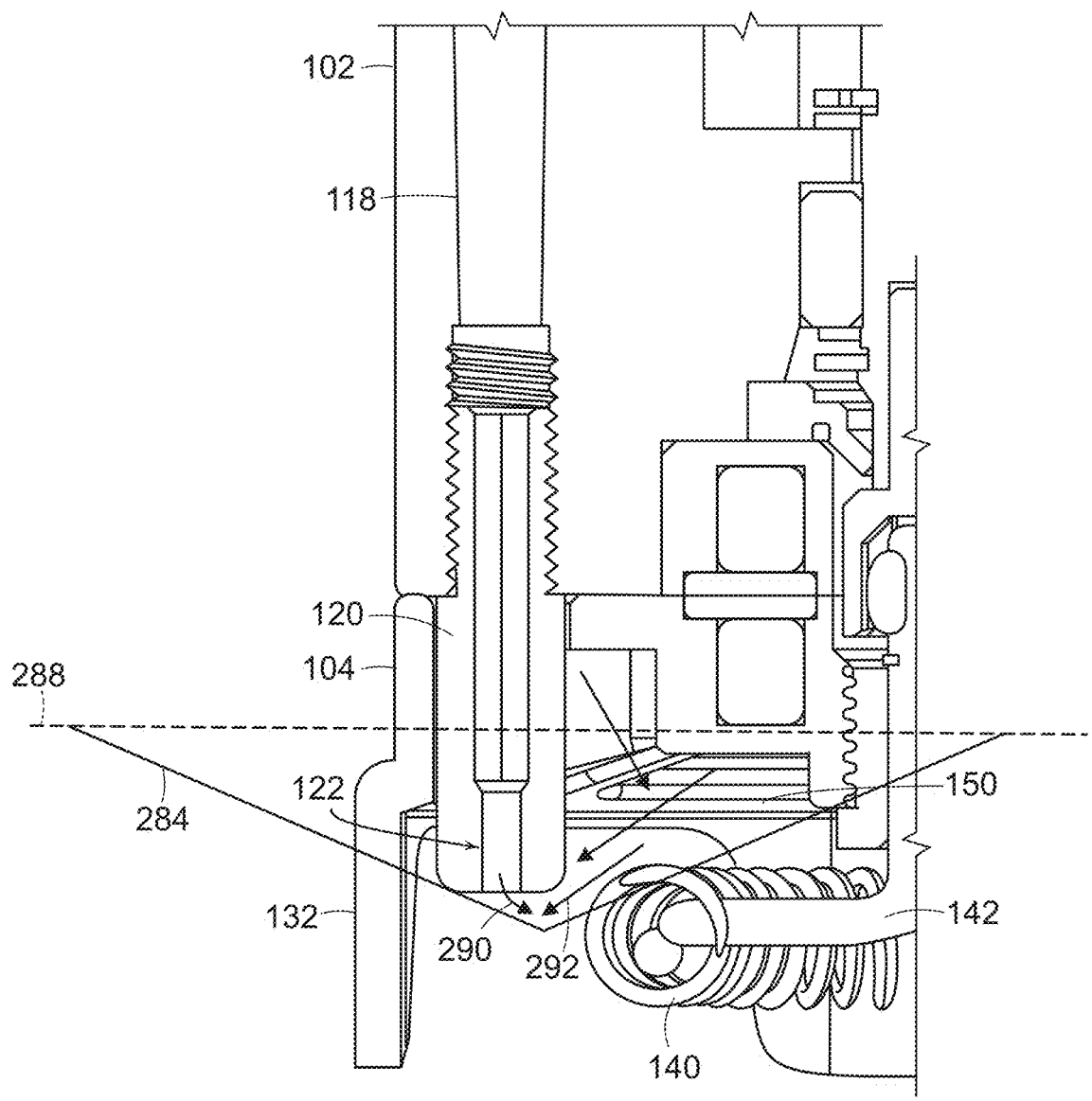
FIG. 22 is a cross-sectional side view of the fluid texturing device of FIG. 20 showing the integration of air and steam into the fluid while creating the first vortex.

It should be noted that the whisk 140, when used sequentially with steam, can vary the amount of air incorporated into the fluid by adjusting the RPM of the whisk 140. Higher RPMs result in a deeper vortex 284, which allows for both steam and air to be momentarily incorporated with one another prior to integrating with the fluid contained in the container 40. This incorporation of air and steam is depicted in detail in FIG. 22, where the air 292 passes through the apertures 150 within the whisk cover 143 and combines with steam ejecting from the outlet 122, prior to contacting and incorporating with the vortex 284. Since the vortex 284 is a deep vortex, the center of the vortex 284 is lower than the top of the whisk cover 143, represented by line 288, which allows air to pass through the apertures 150.

As the first phase 252 ends, the fluid texturing process may not be fully completed. The second phase 254 can be required to further texture fluid to ensure a proper result. In a second phase 254, the whisk 140 may be rotated at a lower RPM when compared to the first phase 252, such as 1000 RPM. The lower RPM of the second phase 254 results in a vortex 286 which is shallower than the vortex 284. The shallow vortex 286 illustrated in FIG. 20 results in air not being introduced to the steam prior to incorporating with the fluid since the vortex 286 is not deep enough to allow air to pass through the apertures 150. This allows just the steam and whisk 140 to texture the fluid for the remaining amount of time of the fluid texturing process. The two or more changes in RPM between different phases throughout the fluid texturing process results in a different micro foam texture. In certain aspects, the first working operation for all micro foam textures may start with a high RPM speed, whereby both steam and air are momentarily incorporated, prior to integrating with the fluid contained in the container 40. Then, the second working operation for each micro foam texture is based on the desired fluid texture, and may include high RPMs, low RPMs, or no rotation of the whisk 140. The amount of simultaneous working time (i.e., steam and whisk rotation) is dictated by the user selection on the user interface 200, resulting in a different level of micro foam texture for each milk-based drink input. By having multiple phases of heating and agitating, the fluid being textured can be heated quickly, providing small bubbles and desirable texture, while also preventing any overheating of the fluid, causing an undesirable result.

In one aspect, the RPMs at which the whisk 140 rotates may be controlled by a user through a user interface. Additionally, in one aspect, the temperature which steam is output and/or a target temperature of a fluid being textured can be manually controlled by a user. For example, a user can select a specific texturing process, such as a latte for oat milk. The fluid texturing device will automatically determine a target temperature based on the selected texturing process parameters. However, a user can also have the option to alter the target temperature if they desire a hotter or colder textured fluid, such as within a range of −5° C. the target temperature to +5° C. the target temperature.

Figure 17B:
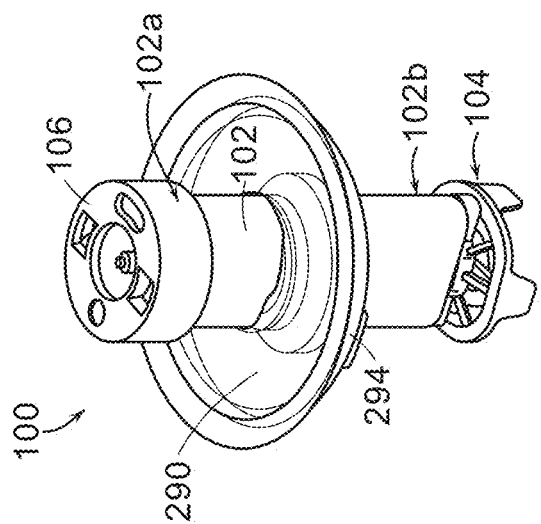
FIG. 17B is a perspective view of the fluid texturing device of FIG. 17A arranged within the lid.
Figure 17A:
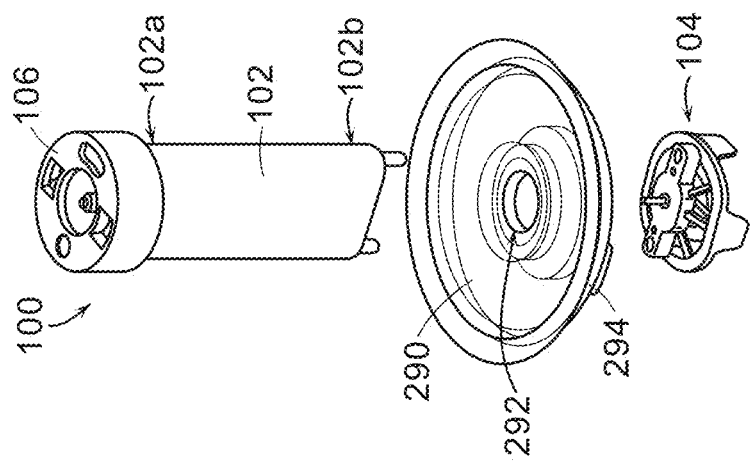

In another embodiment, a container is provided for use with the fluid texturing device. Due to the agitation of a fluid and the release of steam during a fluid texturing process, it can be beneficial to enclose the container where the fluid texturing device is operating. Accordingly, FIGS. 17A-17E illustrate the fluid texturing device 100 used in combination with a cover 290 and a container 40 to form a fluid texturing assembly 101. While the cover can have a variety of configurations, in the illustrated embodiment the cover 290 generally includes an aperture 292 arranged within the center of the cover 290 and a seal 294 arranged around the cover 290. The aperture 292 can be shaped to correspond with the cross-section of the housing 102 so that fluid does not escape between a space between the housing 102 and the cover 290. The fluid texturing device 100 can be inserted into the aperture 292 by removing the whisk assembly 104 from the housing and placing the second end 102b of the housing into the aperture 292. The whisk assembly 104 can then be connected to the housing 102 after the housing 102 is passed through the aperture 292, as shown in FIG. 17B. Even though the aperture 292 is shaped to correspond with the cross-section of the housing 102, the housing 102 can slide freely along a vertical axis relative to the cover 290 while arranged within the aperture 292.

In one aspect, the cover 290 for the container 40 can be designed such that the housing 102 can be inserted into the cover 290 without removal of the whisk assembly 104. In an example embodiment, the cover 290 can include two separate halves/pieces which are configured to be installed on the container 40 on either side of the housing 102, such that the housing can be inserted into the container first, and then the two pieces of the cover 290 can be inserted on the container 40 around the housing 102. The two pieces of the cover can abut one another when arranged on the container 40, and effectively cover the entire opening of the container 40 when arranged thereon except for the aperture which the housing 102 is arranged in. Alternatively, the cover 290 can include a hinge structure where two pieces of the cover 290 are attached to an outer ring of the cover and open/close to enable the installation or removal of the housing 102 from the cover 290 without removal of the whisk assembly 104. A two piece cover 290 would allow for a fluid texturing device 100 where the housing 102 and the whisk assembly 104 are permanently affixed to each other.

Figure 17D:
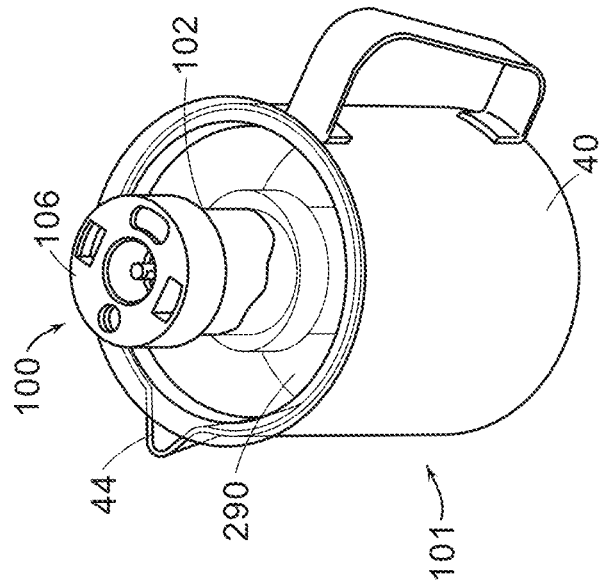
FIG. 17D is a perspective view of the fluid texturing device, lid, and container of FIG. 17C shown fully assembled.
Figure 17C:
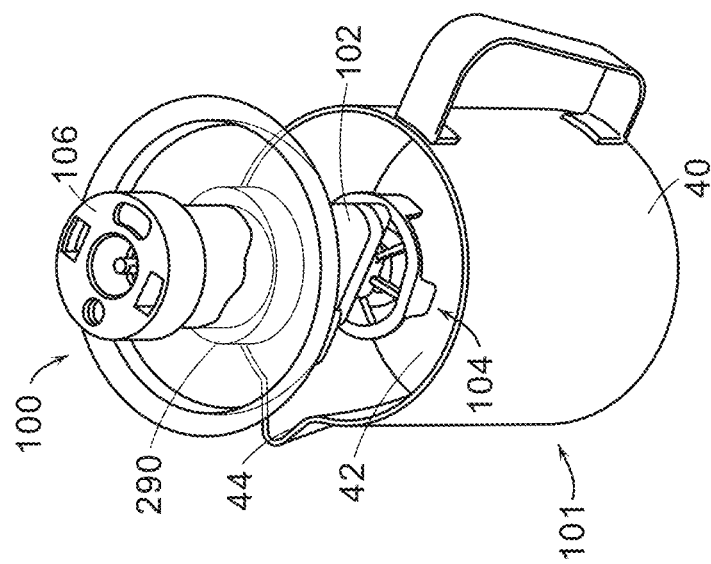
FIG. 17C is a perspective view of the fluid texturing device and lid of FIG. 17B shown in combination with a container.

With the housing 102 arranged within the cover 290, the cover 290 can be positioned on the container 40. The container 40 can include fluid 42 placed within the container to be textured, such as milk or a milk-like fluid. The seal 294 on the cover 290 can abut the edge of the container 40 to keep fluid 42 from spilling out of the container 40 during a texturing process. As illustrated in FIG. 17D, the cover 290 extends across the upper opening of the container 40 to enclose the container. In one embodiment, the container 40 can include a spout 44 which is not covered by the cover 290 to allow a user to dispense fluid 42 from the container 40 without removing the cover 290 from the container 40.

Figure 17F:
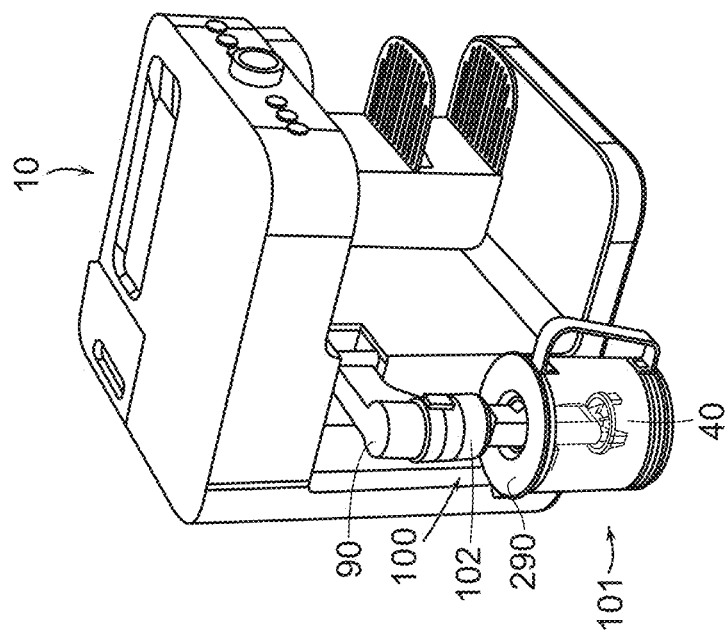
FIG. 17F is a perspective view of the fluid texturing device, lid, and container of FIG. 17E connected to the beverage brewing system of FIG. 1.
Figure 17E:
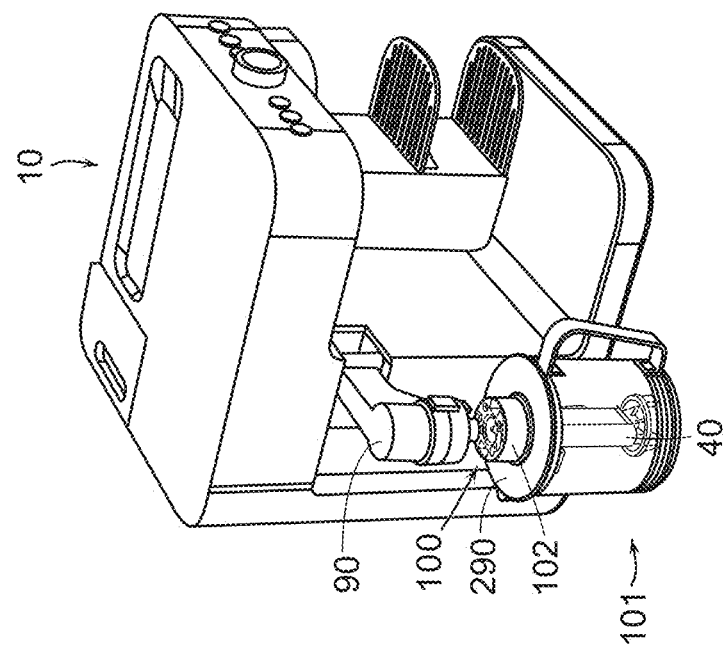
FIG. 17E is a perspective view of the fluid texturing device, lid, and container of FIG. 17D about to be connected to the beverage brewing system of FIG. 1.

With the housing 102 fully advanced into the container 40, as illustrated in FIG. 17E, the fluid texturing assembly 101 can be arranged underneath the mounting arm 90 of the beverage brewing apparatus 10 such that the housing 102 is aligned with the mounting arm 90. With the fluid texturing assembly 101 arranged underneath the mounting arm 90, the housing 102 can be displaced upward along the vertical axis in order to connect the housing 102 with the mounting arm 90, as illustrated in FIG. 17F. The container 40 can rest on a support surface during the connecting process and a texturing process. Alternatively, the entire container 40/housing 102 assembly may be lifted by the user to connect the housing 102 to the mounting arm 90, after which, the container may be lowered to the support surface. In one embodiment, the whisk assembly 104, including tabs 132, does not contact the bottom surface of the container 40 during a texturing process. In order to remove the container 40 to access the textured liquid 42, the buttons 98a, 98b can be depressed, as described above, to release the housing 102 from the mounting arm 90. Where a spout 44 is included, a user can pour the textured liquid from the spout 44 without removing the cover 290 or the housing 102.

Figure 23:
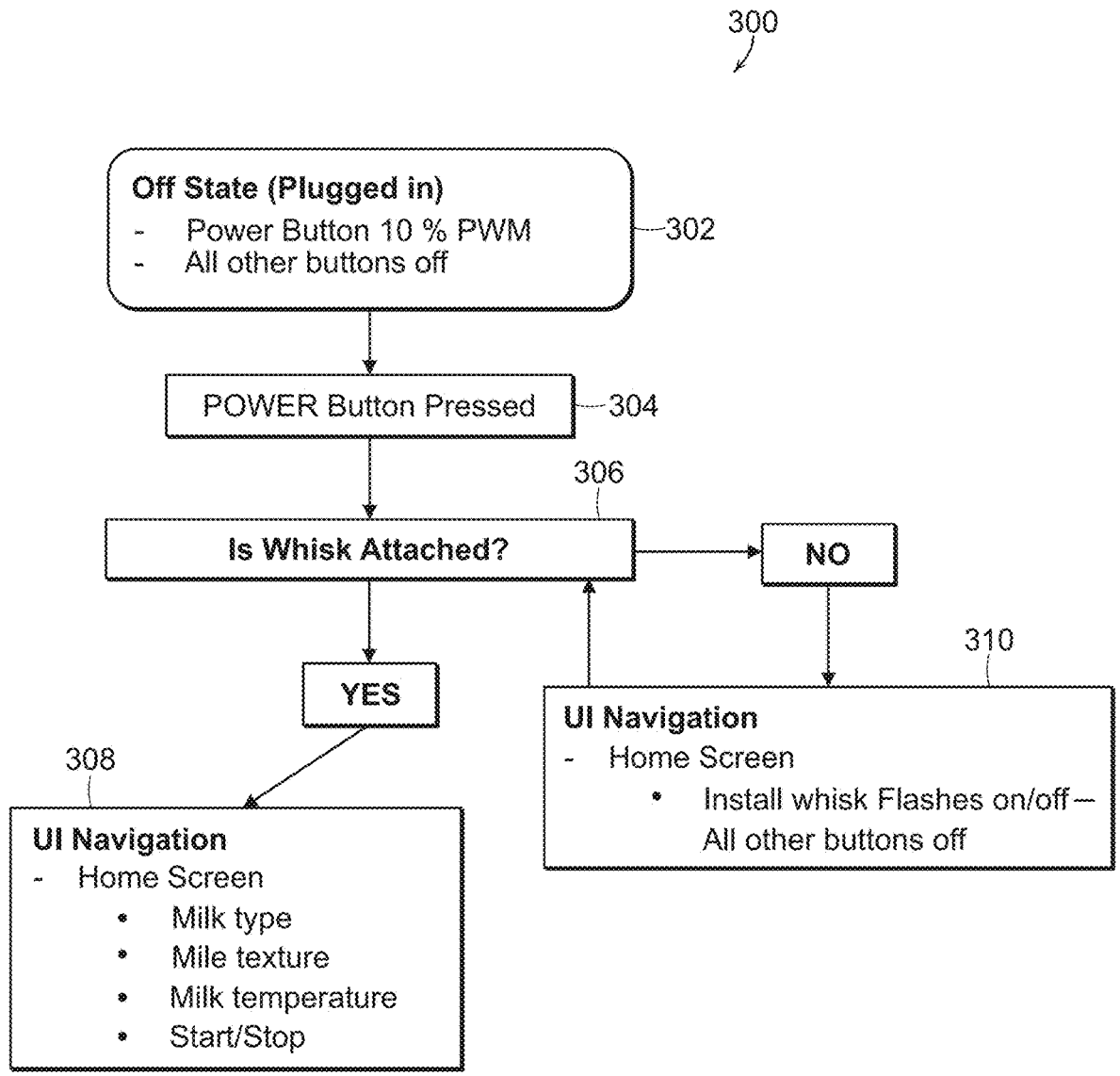
FIG. 23 is a chart illustrating one embodiment of a fluid texturing device detection process performed by the beverage brewing apparatus of FIG. 1.

In certain aspects, the beverage brewing apparatus 10 runs a determination check to ensure that the fluid texturing device 100 is properly secured to the beverage brewing apparatus 10. FIG. 23 represents a process 300 for ensuring that the fluid texturing device 100 is connected and set up for a texturing process. While the beverage brewing apparatus 10 is powered (i.e., plugged into to a 120V wall outlet), the beverage brewing apparatus 10 is in a low-power mode, represented in step 302. In the low-power mode at step 302, the buttons on the user interface are turned off, and the power button is at a 10% power level to illuminate the power button. When the power button is pressed to turn on the beverage brewing apparatus 10 at step 304, the controller within the beverage brewing apparatus 10 may determine if the fluid texturing device 100 is attached to the beverage brewing apparatus 10. The processor may determine the connection state of the fluid texturing device 100 by using the electrical connection between the electrical terminals 80, 86, arranged on the mounting arm 90 and the housing 102, respectively. If no signal is detected from the temperature sensor 130 through the electrical terminals 80, 86, the processor may activate a notification at step 310, such as a blinking light illuminating text stating "Install Whisk". Additionally, all the other buttons and lights on the user interface would be deactivated. Once the fluid texturing device 100 is installed properly, the controller may then activate the user interface at step 308, and allow a user to select their texturing preferences in order to begin a texturing process.

While the above description describes the fluid texturing device 100 in combination with a beverage brewing apparatus, the fluid texturing device 100 can also be implemented as a stand-alone device, where the fluid texturing device can include a separate reservoir and separate heater for producing steam separately from a beverage brewing system.

Certain exemplary implementations have been described to provide an overall understanding of the principles of the structure, function, manufacture, and use of the systems, devices, and methods disclosed herein. One or more examples of these implementations have been illustrated in the accompanying drawings. Those skilled in the art will understand that the systems, devices, and methods specifically described herein and illustrated in the accompanying drawings are non-limiting exemplary implementations and that the scope of the present invention is defined solely by the claims. The features illustrated or described in connection with one exemplary implementation may be combined with the features of other implementations. Such modifications and variations are intended to be included within the scope of the present invention. Further, in the present disclosure, like-named components of the implementations generally have similar features, and thus within a particular implementation each feature of each like-named component is not necessarily fully elaborated upon.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described implementations. Accordingly, the present application is not to be limited by what has been particularly shown and described, except as indicated by the appended claims. All publications and references cited herein are expressly incorporated by reference in their entirety.

What is claimed is:

1. A fluid texturing device, comprising:
a housing extending in a first direction between a first end and a second end, the second end positioned vertically below the first end, the housing having a driveshaft and a steam injection tube extending therethrough along the first direction, the steam injection tube spaced from the driveshaft along a second direction, the second direction being perpendicular to the first direction; and
a whisk assembly positioned vertically below the housing and removably coupled to the second end of the housing and including a whisk configured to mate to the driveshaft such that the driveshaft rotates the whisk, the steam injection tube being configured to extend through the whisk assembly to position a steam outlet on the steam injection tube adjacent to the whisk.

2. The fluid texturing device of claim 1, wherein the whisk assembly includes a whisk cover surrounding the whisk and configured to magnetically couple to the second end of the housing.

3. The fluid texturing device of claim 1 wherein a first end of the driveshaft positioned at the first end of the housing is configured to couple to a motorized driver for causing rotation of the driveshaft about a longitudinal axis thereof.

4. The fluid texturing device of claim 1, wherein the steam injection tube is spaced from the driveshaft such that the steam outlet is spaced from the whisk.

5. A fluid texturing device, comprising:
a housing extending in a first direction between a first end and a second end, the second end positioned vertically below the first end;
a driveshaft disposed within an inner lumen of the housing and extending along the first direction, the driveshaft having a first end coupled to the first end of the housing and configured to couple to a motorized driver for causing rotation of the driveshaft about a longitudinal axis thereof, and a second end adjacent to the second end of the housing and having a whisk mounted thereon and configured to rotate with the driveshaft, the whisk positioned vertically below the housing; and
a steam injection tube extending through the housing along the first direction, the steam injection tube spaced from the driveshaft along a second direction, the second direction being perpendicular to the first direction, the steam injection tube having a first end coupled to the first end of the housing and configured to couple to a steam source, and a second end adjacent to the second end of the housing and having an outlet for ejecting steam therefrom, the steam injection tube being spaced from the driveshaft such that the outlet is spaced from the whisk.

6. The fluid texturing device of claim 5, wherein the first end of the housing has at least one connecting feature configured to removably couple the housing to a beverage brewing apparatus.

7. The fluid texturing device of claim 5, wherein the whisk is removably coupled to the second end of the housing.

8. The fluid texturing device of claim 7, wherein the whisk has a whisk cover configured to magnetically couple to the second end of the housing.

9. The fluid texturing device of claim 5, wherein the steam injection tube passes through an aperture within a whisk cover positioned around the whisk on the second end of the housing.

10. The fluid texturing device of claim 5, wherein the outlet of the steam injection tube is positioned vertically above the whisk.

11. The fluid texturing device of claim 5, wherein a temperature sensor extends from the second end of the housing, and is configured to output a temperature signal representing a temperature of a fluid surrounding the temperature sensor.

12. The fluid texturing device of claim 11, wherein the temperature sensor is positioned vertically above the whisk.

13. A beverage brewing apparatus, comprising:
a primary housing, the primary housing having a mounting arm with a connecting feature thereon; and
a removable fluid texturing device comprising
a hollow secondary housing extending in a first direction between a first end and a second end, the hollow secondary housing having a mating portion configured to removably engage with the connecting feature on the primary housing for removably mating the fluid texturing device to the primary housing,
a driveshaft extending from the mating portion and through the hollow secondary body along the first direction, the driveshaft having a whisk mounted on the second end thereof, the whisk positioned vertically below the driveshaft and vertically below the hollow secondary housing, and
a steam injection tube extending from the mating portion and through the hollow secondary body along the first direction, the steam injection tube having an outlet configured for ejecting steam therefrom, the steam injection tube spaced from the driveshaft along a second direction, the second direction being perpendicular to the first direction.

14. The beverage brewing apparatus of claim 13, wherein a temperature sensor is positioned within the hollow secondary housing adjacent the whisk and is configured to output a temperature signal representing a temperature of a fluid surrounding the temperature sensor.

15. The beverage brewing apparatus of claim 13, wherein the steam injection tube is spaced apart from the driveshaft such that the outlet is spaced from the whisk.

16. The beverage brewing apparatus of claim 13, wherein a first electrical terminal on the connecting feature of the primary housing is configured to contact a second electrical terminal on the mating portion of the hollow secondary housing.

17. The beverage brewing apparatus of claim 13, wherein the driveshaft is mechanically coupled to a motor arranged within the primary housing through the mating connection between the connecting feature and the mating portion.

18. The beverage brewing apparatus of claim 13, wherein the primary housing includes a controller having a processor configured to control delivering of steam from a steam source to the steam injection tube, and configured to control a motor in the primary housing for driving the driveshaft on the fluid texturing device to thereby rotate the whisk.

19. The beverage brewing apparatus of claim 18, wherein the controller is configured to receive a temperature signal from a temperature sensor disposed within the fluid texturing device, and wherein when the temperature of the fluid is within a first temperature range the controller is configured to cause the motor to operate at a first predetermined speed, and when the temperature of the fluid is within a second temperature range greater than the first temperature range the controller is configured to cause the motor to operate at a second predetermined motor speed that is less than the first predetermined motor speed.

20. The beverage brewing apparatus of claim 19, wherein the first predetermined motor speed is configured to create a first vortex within the fluid such that steam emitted from the outlet of the steam injection tube and air surrounding a volume of the fluid is mixed prior to integration of the steam and air with the fluid.

21. The beverage brewing apparatus of claim 19, wherein the second predetermined motor speed is configured to create a vortex within the fluid such that steam emitted from the outlet of the steam injection, and not air surrounding a volume of the fluid, is mixed with the fluid.

22. The beverage brewing apparatus of claim 19, wherein the controller is configured to receive a user input, and wherein a working time over which the second predetermined motor speed is employed is varied based upon the user input.

23. The beverage brewing apparatus of claim 13, wherein the mounting arm is movably coupled to the primary housing.

24. The beverage brewing apparatus of claim 18, wherein the controller is configured to detect attachment of the removable fluid texturing device to the primary housing.

25. The beverage brewing apparatus of claim 13, wherein the primary housing has a fluid reservoir, a fluid outlet, and at least one heater configured to heat fluid flowing from the fluid reservoir to the fluid outlet.

26. A fluid texturing assembly, comprising:
 a container having an opening and configured to retain a fluid therein;
 a cover configured to be positioned across the opening of the container, the cover including an aperture formed therein; and
 a fluid texturing device having
  a housing extending in a first direction between a first end and a second end, the second end positioned vertically below the first end, the housing being configured to be slidably disposed through the aperture in the cover, and the housing include a driveshaft and a steam injection tube extending therethrough, the steam injection tube spaced from the driveshaft along a second direction perpendicular to the first direction, and
  a whisk assembly positioned vertically below the housing and removably coupled to the housing and including a rotatable whisk.

27. The fluid texturing assembly of claim 26, wherein, when the whisk assembly is coupled to the housing, the steam injection tube is configured to extend through the whisk assembly to position a steam outlet at an end thereof adjacent the whisk for ejecting steam therefrom.

28. The fluid texturing assembly of claim 26, wherein the housing has a first end configured to removably couple to a beverage brewing apparatus, and a second end configured to removably couple to the whisk assembly.

* * * * *